US011038557B2

(12) United States Patent
Nam et al.

(10) Patent No.: US 11,038,557 B2
(45) Date of Patent: Jun. 15, 2021

(54) METHOD AND APPARATUS FOR TRANSMITTING AND RECEIVING REFERENCE SIGNALS IN WIRELESS COMMUNICATION

(71) Applicant: Samsung Electronics Co., Ltd, Suwon-si (KR)

(72) Inventors: Young-Han Nam, Plano, TX (US); Boon Loong Ng, Plano, TX (US); Yang Li, Plano, TX (US); Sudhir Ramakrishna, Plano, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/472,212

(22) Filed: Mar. 28, 2017

(65) Prior Publication Data
US 2017/0288743 A1 Oct. 5, 2017

Related U.S. Application Data

(60) Provisional application No. 62/316,159, filed on Mar. 31, 2016, provisional application No. 62/361,433, (Continued)

(51) Int. Cl.
H04B 7/024 (2017.01)
H04B 7/06 (2006.01)
H04L 5/00 (2006.01)

(52) U.S. Cl.
CPC ........... H04B 7/024 (2013.01); H04B 7/0617 (2013.01); H04B 7/0626 (2013.01); H04L 5/006 (2013.01);
(Continued)

(58) Field of Classification Search
CPC .............. H04W 72/042; H04W 84/042; H04L 5/0035; H04L 5/0023; H04L 5/0048; H04L 5/0091; H04L 25/0204
See application file for complete search history.

(56) References Cited

U.S. PATENT DOCUMENTS 9,179,453 B2 * 11/2015 Papasakellariou ........................... H04W 72/0413
9,203,576 B2 * 12/2015 Frenne .................. H04L 5/0023
(Continued)

FOREIGN PATENT DOCUMENTS

CN WO 2016033978 A1 * 3/2016 ............... H04B 7/26
WO 2013025236 A1 2/2013
(Continued)

OTHER PUBLICATIONS

Technical Specification. LTE; Evolved Universal Terrestrial Radio Access (E-UTRA); Physical Channels and Modulation; 3GPP TS 36.211 version 13.1.0 Release 13; ETSI TS 136 211 v13.1.0 (Apr. 2016), 157 pages.
(Continued)

Primary Examiner — Berhanu Tadese

(57) ABSTRACT

A base station includes a controller configured to configure an MRS resource set comprising a group of MRS resources, each MRS resource comprising a set of MRS antenna ports. If at least two MRS antenna ports belong to a same MRS resource, then the at least two MRS antenna ports are quasi co-located with respect to a first set of QCL parameters, else if the at least two MRS antenna ports belong to a same MRS resource set, then the at least two MRS antenna ports are quasi co-located with respect to a second set of QCL parameters, and else the at least two MRS antenna ports are not quasi co-located with respect to either the first set or the second set of QCL parameters. The MRS is a CSI-RS for
(Continued)

estimating a CSI and at least one of the first set and the second set of QCL parameters.

32 Claims, 19 Drawing Sheets

Related U.S. Application Data filed on Jul. 12, 2016, provisional application No. 62/402,466, filed on Sep. 30, 2016.

(52) U.S. Cl.
CPC .......... *H04L 5/0023* (2013.01); *H04L 5/0035* (2013.01); *H04L 5/0053* (2013.01); *H04L 5/0091* (2013.01)

(56) References Cited

U.S. PATENT DOCUMENTS

| | | | |
|---|---|---|---|
| 9,332,469 B2* | 5/2016 | Davydov | H04W 72/08 |
| 9,491,751 B2* | 11/2016 | Park | H04W 72/042 |
| 9,521,665 B2* | 12/2016 | Park | H04L 5/0035 |
| 9,554,371 B2* | 1/2017 | Kim | H04L 1/0026 |
| 9,578,671 B2* | 2/2017 | Blankenship | H04W 76/15 |
| 9,596,067 B2* | 3/2017 | Kim | H04W 72/0446 |
| 9,730,211 B2* | 8/2017 | Park | H04L 5/0035 |
| 9,735,933 B2* | 8/2017 | Park | H04L 5/0051 |
| 9,930,515 B2* | 3/2018 | Park | H04W 8/005 |
| 9,948,378 B2* | 4/2018 | Kim | H04L 5/0048 |
| 10,051,615 B2* | 8/2018 | Park | H04L 5/0035 |
| 10,219,265 B2* | 2/2019 | You | H04L 5/005 |
| 2010/0272032 A1 | 10/2010 | Sayana et al. | |
| 2011/0268028 A1* | 11/2011 | Stern-Berkowitz | H04L 5/0048 370/328 |
| 2012/0163318 A1 | 6/2012 | Kishiyama et al. | |
| 2013/0265978 A1* | 10/2013 | Noh | H04L 5/0051 370/329 |
| 2013/0279437 A1* | 10/2013 | Ng | H04L 25/0224 370/329 |
| 2014/0016497 A1 | 1/2014 | Seo et al. | |
| 2014/0036800 A1* | 2/2014 | Frenne | H04L 5/0048 370/329 |
| 2014/0119266 A1* | 5/2014 | Ng | H04L 27/2602 370/312 |
| 2014/0198747 A1* | 7/2014 | Ouchi | H04L 5/0053 370/329 |
| 2014/0204885 A1* | 7/2014 | Qu | H04L 5/0023 370/329 |
| 2014/0226551 A1* | 8/2014 | Ouchi | H04W 52/40 370/311 |
| 2014/0247796 A1* | 9/2014 | Ouchi | H04L 5/0053 370/329 |
| 2014/0286255 A1* | 9/2014 | Nam | H04L 27/2613 370/329 |
| 2014/0295909 A1* | 10/2014 | Ouchi | H04W 52/40 455/522 |
| 2014/0301301 A1* | 10/2014 | Cheng | H04W 36/0072 370/329 |
| 2014/0314000 A1* | 10/2014 | Liu | H04W 52/365 370/329 |
| 2014/0321391 A1 | 10/2014 | Zhang et al. | |
| 2015/0023270 A1* | 1/2015 | Park | H04L 27/2613 370/329 |
| 2015/0029874 A1* | 1/2015 | Davydov | H04W 24/08 370/252 |
| 2015/0029966 A1* | 1/2015 | Park | H04L 5/0053 370/329 |
| 2015/0092768 A1* | 4/2015 | Ng | H04W 48/16 370/350 |
| 2015/0171948 A1 | 6/2015 | Xiao et al. | |
| 2015/0173064 A1* | 6/2015 | Kim | H04B 17/00 370/252 |
| 2015/0180625 A1* | 6/2015 | Park | H04W 72/042 370/329 |
| 2015/0207605 A1* | 7/2015 | Jongren | H04L 5/0023 370/329 |
| 2015/0208266 A1 | 7/2015 | Jung et al. | |
| 2015/0215906 A1* | 7/2015 | Park | H04L 12/1881 370/312 |
| 2015/0249972 A1* | 9/2015 | You | H04L 5/0035 370/254 |
| 2015/0249973 A1* | 9/2015 | Park | H04L 5/001 370/329 |
| 2015/0257130 A1* | 9/2015 | Lee | H04L 5/1469 370/336 |
| 2015/0289235 A1* | 10/2015 | Park | H04L 5/0053 370/329 |
| 2015/0319775 A1* | 11/2015 | Takeda | H04L 25/00 370/329 |
| 2015/0341882 A1* | 11/2015 | Davydov | H04L 5/0053 370/336 |
| 2015/0358848 A1* | 12/2015 | Kim | H04L 5/0053 370/252 |
| 2015/0365154 A1* | 12/2015 | Davydov | H04B 7/0626 370/329 |
| 2016/0006547 A1* | 1/2016 | Kang | H04L 5/0094 370/329 |
| 2016/0056875 A1* | 2/2016 | Kang | H04B 7/0617 370/329 |
| 2016/0088596 A1* | 3/2016 | Frenne | H04L 5/0035 370/336 |
| 2016/0373225 A1* | 12/2016 | Kim | H04L 25/0224 |
| 2017/0026938 A1* | 1/2017 | Onggosanusi | H04B 7/0626 |
| 2017/0070276 A1* | 3/2017 | Kim | H04W 72/042 |
| 2017/0086153 A1* | 3/2017 | Yoon | H04W 56/001 |
| 2017/0105112 A1* | 4/2017 | Park | H04W 8/005 |
| 2017/0118665 A1* | 4/2017 | Park | H04B 7/0626 |
| 2017/0126452 A1* | 5/2017 | Sandberg | H04L 27/2613 |
| 2017/0180194 A1* | 6/2017 | Noh | H04L 5/0048 |
| 2017/0201308 A1* | 7/2017 | Park | H04B 7/0417 |
| 2017/0207932 A1* | 7/2017 | Kim | H04J 13/18 |
| 2017/0208588 A1* | 7/2017 | Park | H04L 27/2656 |
| 2017/0215097 A1* | 7/2017 | Park | H04L 5/0048 |
| 2017/0223686 A1* | 8/2017 | You | H04L 5/0048 |
| 2017/0237535 A1* | 8/2017 | Park | H04W 72/0426 370/329 |
| 2017/0288743 A1* | 10/2017 | Nam | H04L 5/0035 |
| 2017/0311313 A1* | 10/2017 | Park | H04L 5/005 |
| 2017/0346540 A1* | 11/2017 | Kang | H04B 7/0626 |
| 2017/0353949 A1* | 12/2017 | Frenne | H04W 72/042 |
| 2017/0366996 A1* | 12/2017 | Park | H04W 24/10 |
| 2018/0034525 A1* | 2/2018 | Park | H04L 5/0048 |
| 2018/0262882 A1* | 9/2018 | You | H04W 72/005 |

FOREIGN PATENT DOCUMENTS

| | | | | |
|---|---|---|---|---|
| WO | WO-2013025236 A1 * | 2/2013 | | H04B 3/36 |
| WO | WO-2014020580 A1 * | 2/2014 | | H04L 5/0035 |
| WO | 2014/129716 A1 | 8/2014 | | |
| WO | WO-2014129716 A1 * | 8/2014 | | H04L 5/0035 |
| WO | 2014171869 A1 | 10/2014 | | |
| WO | WO-2014171869 A1 * | 10/2014 | | H04W 52/18 |

OTHER PUBLICATIONS

Technical Specification. LTE; Evolved Universal Terrestrial Radio Access (E-UTRA); Multiplexing and Channel Coding; 3GPP TS 36.212 version 13.1.0 Release 13; ETSI TS 136 212 v13.1.0 (Apr. 2016), 130 pages.

Technical Specification. LTE; Evolved Universal Terrestrial Radio Access (E-UTRA); Physical Layer Procedures; 3GPP TS 36.213 version 13.1.1 Release 13; ETSI TS 136 213 V13.1.1 (May 2016), 363 pages.

Technical Specification. Universal Mobile Telecommunications System (UMTS); LTE; Evolved Universal Terrestrial Radio Access (E-UTRA); Physical Layer for Relaying Operation; 3GPP TS 36.216 version 12.0.0 Release 12; ETSI TS 136 216 V12.0.0 (Oct. 2014), 18 pages.

(56) References Cited

OTHER PUBLICATIONS

Technical Specification. LTE; Evolved Universal Terrestrial Radio Access (E-UTRA) and Evolved Universal Terrestrial Radio Access Network (E-UTRAN); Overall Description; Stage 2; 3GPP TS 36.300 version 13.2.0 Release 13; ETSI TS 136 300 V13.2.0 (Jan. 2016), 299 pages.

Technical Specification. LTE; Evolved Universal Terrestrial Radio Access (E-UTRA); Radio Resource Control (RRC); Protocol Specification; 3GPP TS 36.331 version 12.3.0 Release 12; ETSI TS 136 331 V12.3.0 (Sep. 2014), 383 pages.

Samsung, "Remaining issues on quasi co-location of antenna ports", 3GPP TSG-RAN WG1 #70 meeting, Aug. 13-17, 2012, 8 pages.

Supplementary Partial European Search Report dated Mar. 8, 2019 in connection with European Patent Application No. 17 77 5905, 16 pages.

Supplementary European Search Report dated Jul. 10, 2019 in connection with European Patent Application No. 17 77 5905, 11 pages.

Intel Corporation, "Introduction of CRI reporting for PUSCH CSI reporting modes 1-0 and 1-1," 3GPP TSG RAN WG1 Meeting #84, R1-160400, St. Julian's, Malta, Feb. 15-19, 2016, 5 pages.

ITRI, "Discussion on DCI Signalling for DMRS Enhancement," 3GPP TSG RAN WG1 Meeting #83, R1-157084, Anaheim, USA, Nov. 15-22, 2015, 5 pages.

QUALCOMM INC., "Beamformed CSI-RS design for CSI reporting class B," 3GPP TSG-RAN WG1 #83, R1-157053, Anaheim, USA, Nov. 15-22, 2015, 5 pages.

Samsung, "Draft CR on CSI-RS for class a CSI reporting," 3GPP TSG RAN WG1 Meeting #84, R1-160523, St. Julian's, Malta, Feb. 15-19, 2016, 5 pages.

ISA/KR, "International Search Report," Application No. PCT/KR2017/003565, Jul. 18, 2017, Korean Intellectual Property Office, Daejeon, KR, 8 pages.

ISA/KR, "Written Opinion of the International Searching Authority," Application No. PCT/KR2017/003565, Jul. 18, 2017, Korean Intellectual Property Office, Daejeon, KR, 7 pages.

Communication pursuant to Article 94(3) EPC in connection with European Application No. 17775905.7 dated Apr. 14, 2020, 8 pages.

Communication pursuant to Article 94(3) EPC in connection with European Application No. 17775905.7 dated Jun. 2, 2020, 5 pages.

\* cited by examiner

METHOD AND APPARATUS FOR TRANSMITTING AND RECEIVING REFERENCE SIGNALS IN WIRELESS COMMUNICATION

CROSS-REFERENCE TO RELATED APPLICATIONS AND CLAIMS OF PRIORITY

This application claims priority under 35 U.S.C. § 119(e) to: U.S. Provisional Patent Application No. 62/316,159 filed on Mar. 31, 2016; U.S. Provisional Patent Application No. 62/361,433 filed on Jul. 12, 2016; and U.S. Provisional Patent Application No. 62/402,466 filed on Sep. 30, 2016. The above-identified provisional patent applications are hereby incorporated by reference in their entirety.

TECHNICAL FIELD

This disclosure relates generally to wireless communication systems. More specifically, this disclosure relates to method and apparatus for the configuration and transmission of the up-link demodulation reference signals (UL-DMRS). The present disclosure also relates to supporting signaling of quasi-colocation of antenna ports or beams for transmissions from user equipments (UEs) to a base station or for transmissions from a base station to UEs.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

Various embodiments of the present disclosure provide methods and apparatuses for quasi co-location of antenna ports and beams for new radio. Various embodiments of the present disclosure also provide up-link demodulation reference symbol generation and placement for enhanced up-link multi-user MIMO communications.

In a first embodiment, a base station includes a controller configured to configure a measurement reference signal (MRS) resource set comprising a group of MRS resources, each MRS resource comprising a set of respective MRS antenna ports, wherein if at least two MRS antenna ports belong to a same MRS resource, then the at least two MRS antenna ports are quasi co-located with respect to a first set of quasi co-located large scale channel parameters (QCL parameters), else if the at least two MRS antenna ports belong to a same MRS resource set, then the at least two MRS antenna ports are quasi co-located with respect to a second set of QCL parameters, and else the at least two MRS antenna ports are not quasi co-located with respect to either the first set or the second set of QCL parameters unless indicated otherwise, a transceiver configured to transmit the MRS resource set to a user equipment, wherein the MRS is a channel state information reference signal (CSI-RS) for estimating a CSI and at least one of the first set of QCL parameters and the second set of QCL parameters.

In a second embodiment, a user equipment (UE) includes a transceiver configured to receive a measurement reference signal (MRS) resource set comprising a group of MRS resources, each MRS resource comprising a set of respective MRS antenna ports, wherein if at least two MRS antenna ports belong to a same MRS resource, then the at least two MRS antenna ports are quasi co-located with respect to a first set of quasi co-located large scale channel parameters (QCL parameters), else if the at least two MRS antenna ports belong to a same MRS resource set, then the at least two MRS antenna ports are quasi co-located with respect to a second set of QCL parameters, and else the at least two MRS antenna ports are not quasi co-located with respect to either the first set or the second set of QCL parameters unless indicated otherwise, and a controller configured to be configured the measurement reference signal (MRS) resource set, wherein the MRS is a channel state information reference signal (CSI-RS) for estimating a CSI and at least one of the first set of QCL parameters and the second set of QCL parameters.

In a third embodiment, A method for operating a base station, the method includes configuring a measurement reference signal (MRS) resource set comprising a group of MRS resources, each MRS resource comprising a set of respective MRS antenna ports, wherein if at least two MRS antenna ports belong to a same MRS resource, then the at least two MRS antenna ports are quasi co-located with respect to a first set of quasi co-located large scale channel parameters (QCL parameters), else if the at least two MRS antenna ports belong to a same MRS resource set, then the at least two MRS antenna ports are quasi co-located with respect to a second set of QCL parameters, and else the at least two MRS antenna ports are not quasi co-located with respect to either the first set or the second set of QCL parameters unless indicated otherwise, and transmitting the MRS resource set to a user equipment, wherein the MRS is a channel state information reference signal (CSI-RS) for estimating a CSI and at least one of the first set of QCL parameters and the second set of QCL parameters.

In a fourth embodiment, A base station includes a transceiver configured to transmit Physical Uplink Shared Channel (PUSCH) transmission parameters to a user equipment (UE), and a controller configured to configure the uplink PUSCH transmission parameters including a cyclic shift, a orthogonal cover code (OCC) and comb offset parameters $O^{(\lambda)}(0)$ and $O^{(\lambda)}(1)$, wherein for up-to eight LIE multi user (MU)—multi input multi output (MIMO) with one layer per UE, the comb offset parameters $O^{(\lambda)}(0)$ and $O^{(\lambda)}(1)$ are determined according to a following table:

| Cyclic Shift Field in uplink-related downlink control information (DCI) format | $[O^{(\lambda)}(0)\ O^{(\lambda)}(1)]$ |
|---|---|
| 000 | [0 0] |
| 001 | [0 0] |
| 010 | [0 0] |
| 011 | [1 1] |
| 100 | [1 1] |
| 101 | [1 1] |
| 110 | [1 1] |
| 111 | [0 0] |

In a fifth embodiment, a user equipment includes a transceiver configured to receive Physical Uplink Shared Channel (PUSCH) transmission parameters to UE, and a controller configured to generate a Demodulation reference signal (DMRS) sequence using uplink PUSCH transmission parameters, wherein the uplink PUSCH transmission parameters includes a cyclic shift, a orthogonal cover code (OCC) and comb offset parameters $O(\lambda)(0)$ and $O(\lambda)(1)$, wherein for up-to eight UE multi user (MU)—multi input multi output with one layer per UE, the comb offset parameters $O(\lambda)(0)$ and $O(\lambda)(1)$ are determined according to a following table:

| Cyclic Shift Field in uplink-related downlink control information (DCI) format | $[O^{(\lambda)}(0)\ O^{(\lambda)}(1)]$ |
| --- | --- |
| 000 | [0 0] |
| 001 | [0 0] |
| 010 | [0 0] |
| 011 | [1 1] |
| 100 | [1 1] |
| 101 | [1 1] |
| 110 | [1 1] |
| 111 | [0 0] |

Other technical features may be readily apparent to one skilled in the art from the following FIGURES, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein:

3rd generation partnership project (3GPP) TS 36.211 v13.1.0, "E-UTRA, Physical channels and modulation" ("REF 1"); 3GPP TS 36.212 v13.1.0, "E-UTRA, Multiplexing and Channel coding" ("REF 2"); 3GPP TS 36.213 v13.1.1, "E-UTRA, Physical Layer Procedures" ("REF 3"); 3GPP TS 36.331 v12.3.0, "E-UTRA, Radio Resource Control (RRC) Protocol Specification" ("REF 4"); 3GPP TS 36.300 v13.0.0 "E-UTRA and E-UTRAN, Overall description, Stage 2" ("REF 5"); and 3GPP TS 36.216 v12.0.0, "E-UTRA, Medium Access Control (MAC) protocol specification" ("REF 6").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
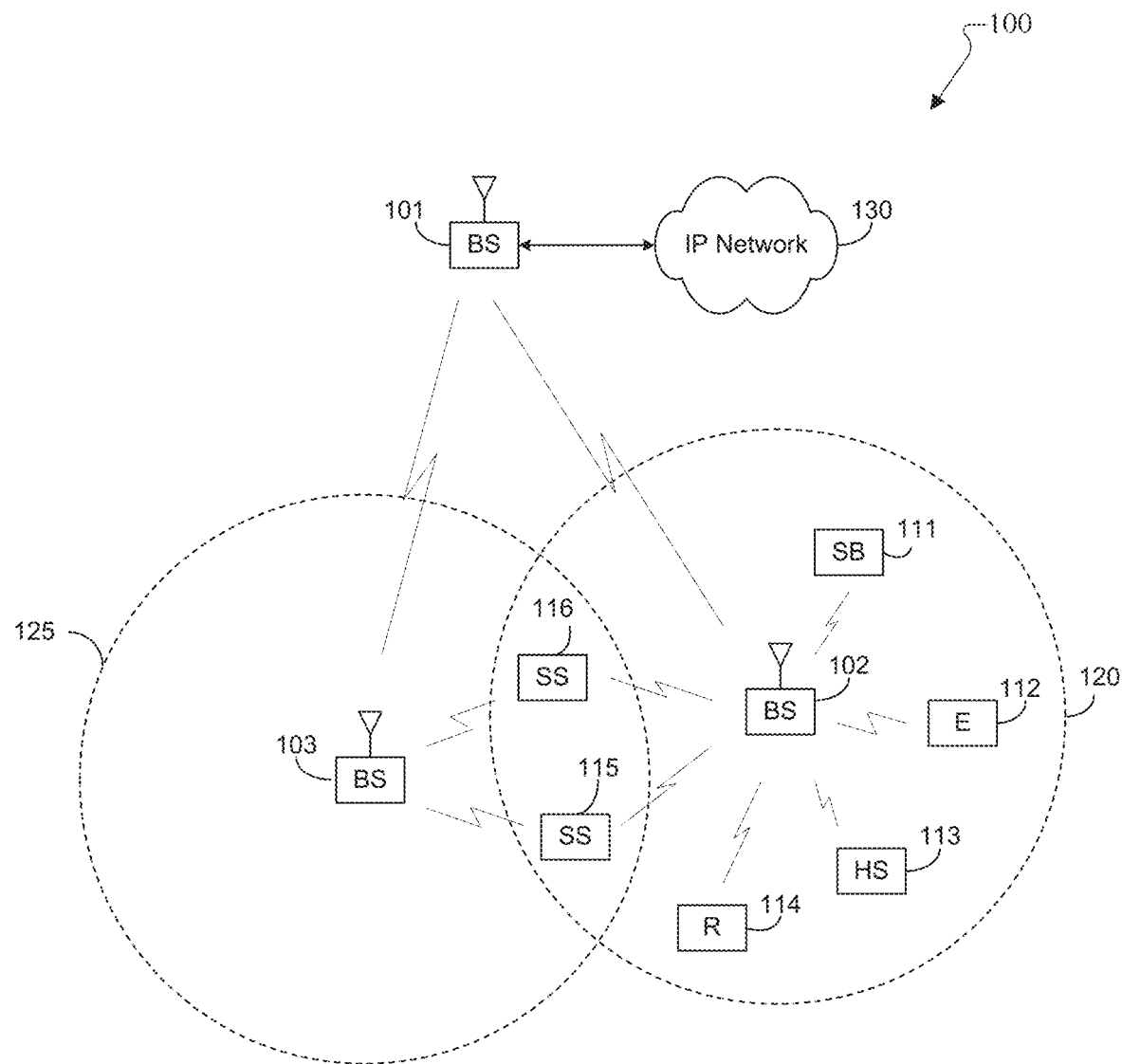
FIG. 1 illustrates an example wireless network according to some embodiments of the present disclosure.

FIG. 1 illustrates an example wireless network 100 according to some embodiments of the present disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support quasi co-location of antenna ports and beams for new radio and up-link demodulation reference symbol generation and placement for enhanced up-link multi-user MIMO communications.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
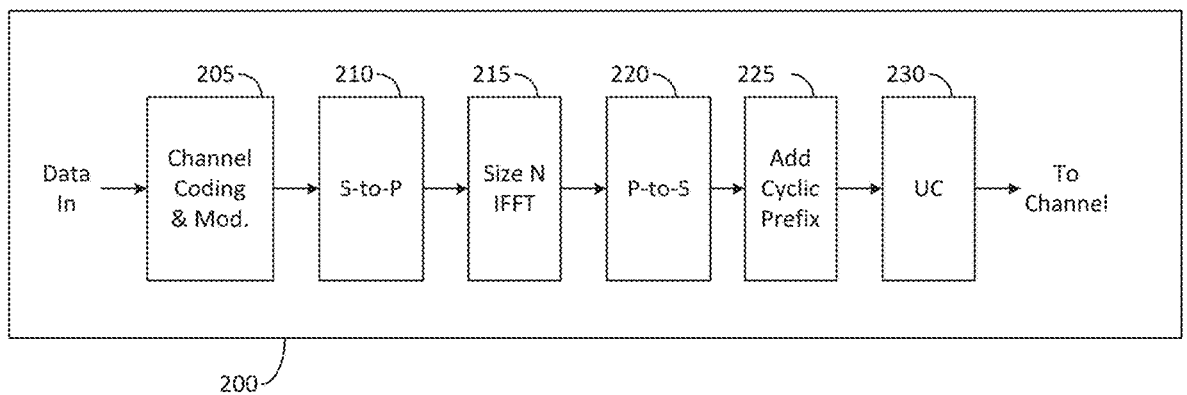
FIGS. 2A and 2B illustrate example wireless transmit and receive paths according to some embodiments of the present disclosure.
Figure 2B:
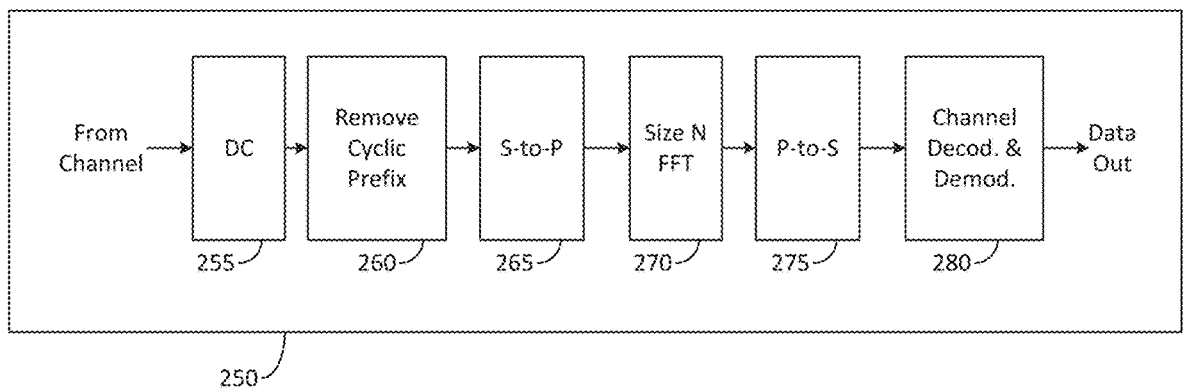

FIGS. 2A and 2B illustrate example wireless transmit and receive paths according to some embodiments of the present disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support quasi co-location of antenna ports and beams for new radio and up-link demodulation reference symbol generation and placement for enhanced up-link multi-user MIMO communications.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
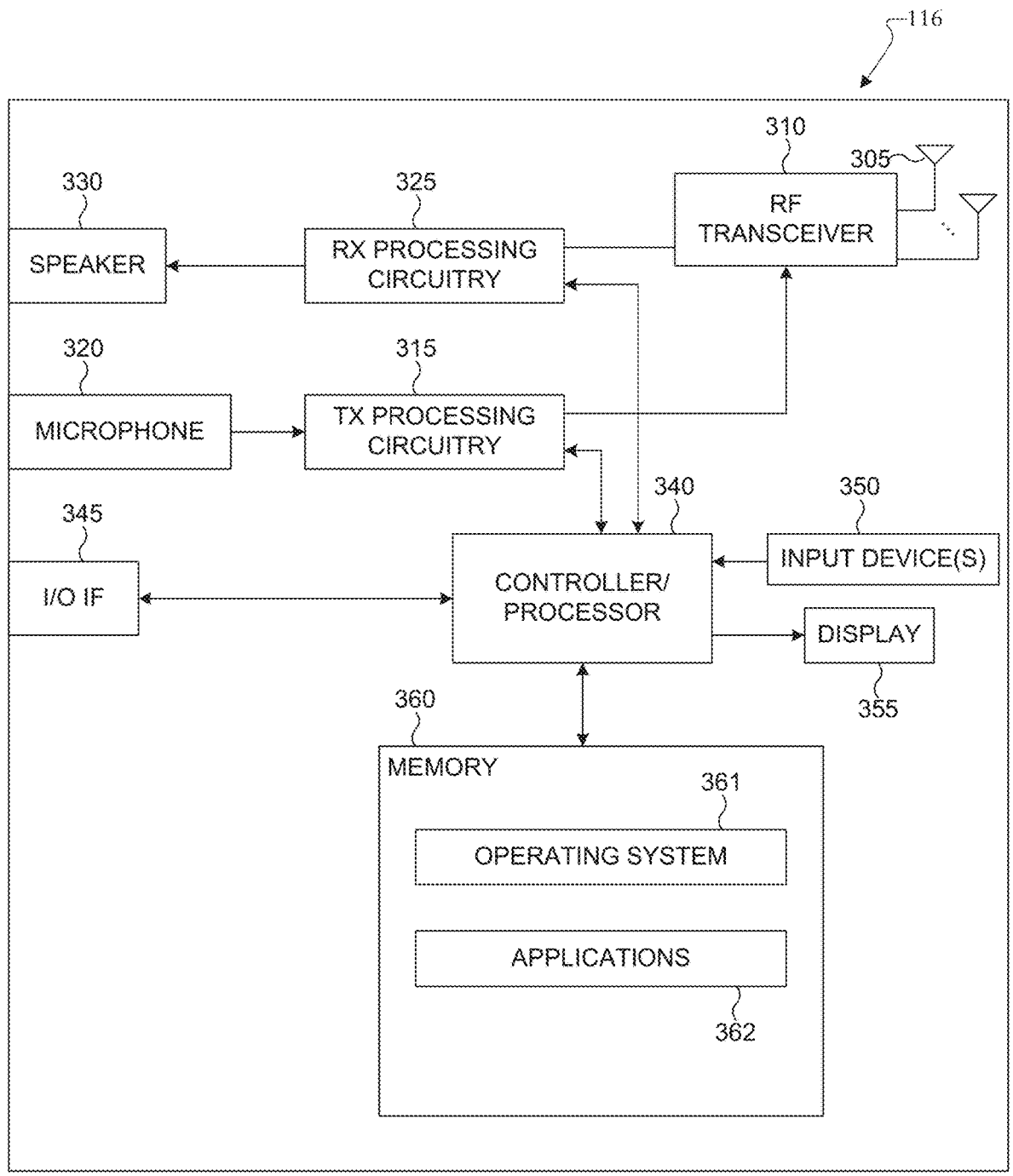
FIG. 3A illustrates an example user equipment according to some embodiments of the present disclosure.

FIG. 3A illustrates an example UE 116 according to some embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
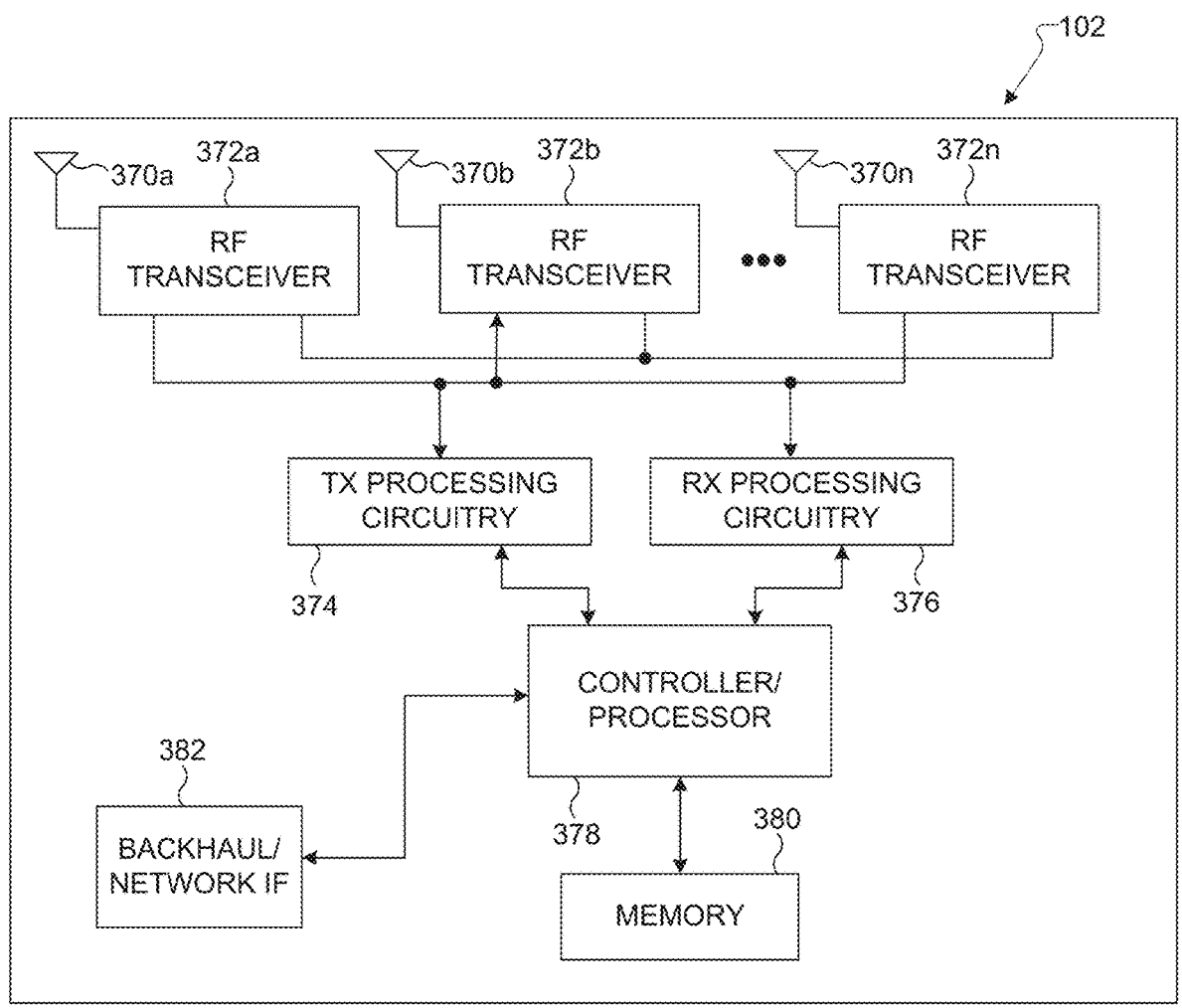
FIG. 3B illustrates an example enhanced NodeB (eNB) according to some embodiments of the present disclosure.

FIG. 3B illustrates an example eNB 102 according to some embodiments of the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting quasi co-location of antenna ports and beams for new radio and up-link demodulation reference symbol generation and placement for enhanced up-link multi-user MIMO communications as described in embodiments of the present disclosure. In some embodiments, the controller/processor 378 supports communications between entities, such as web Real-Time Communication (RTC). The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
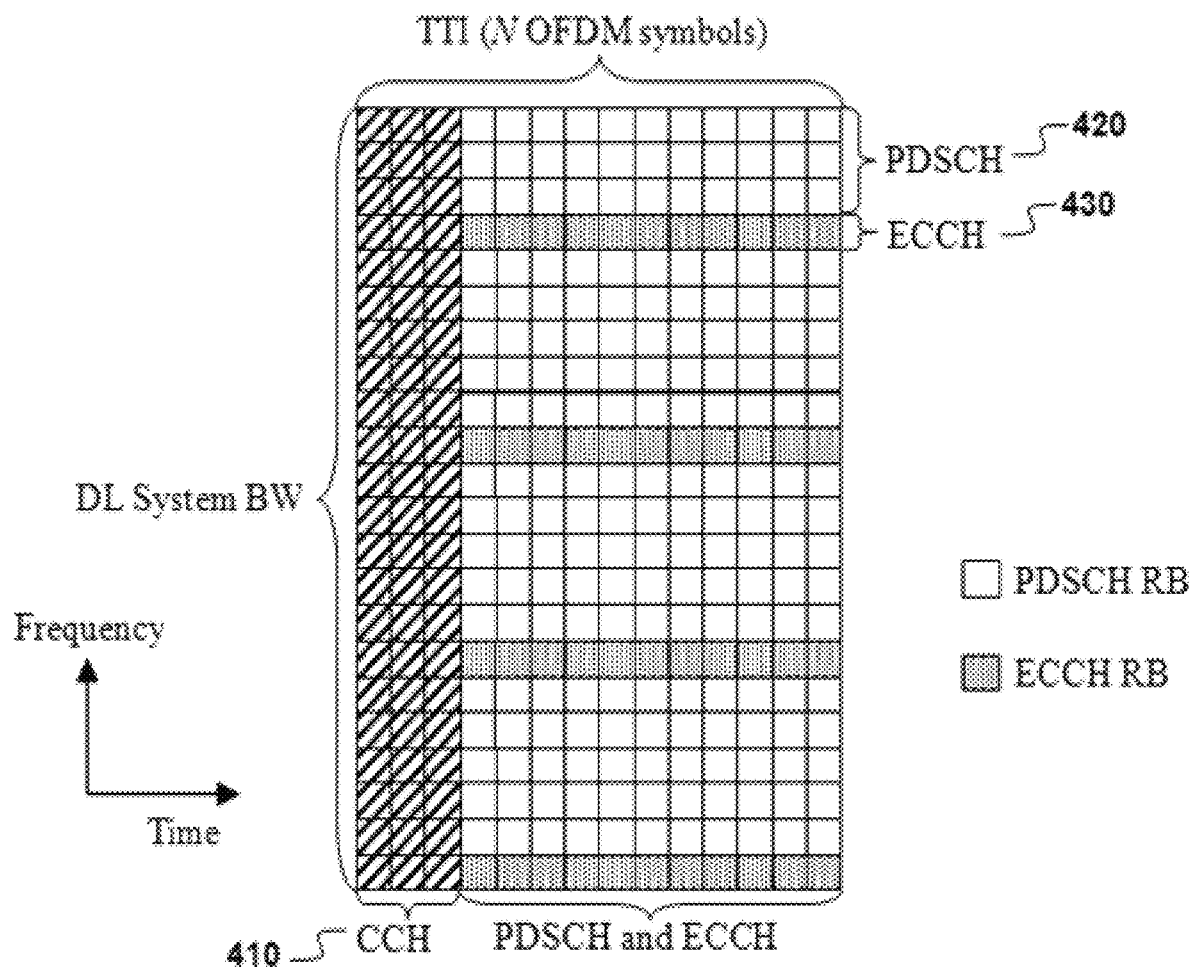
FIG. 4 illustrates a structure of a DL Transmission Time Interval (TTI) according to embodiments of the present disclosure.

FIG. 4 illustrates a structure of a DL Transmission Time Interval (TTI) according to embodiments of the present disclosure.

Referring to FIG. 4, DL signaling uses Orthogonal Frequency Division Multiplexing (OFDM) and a DL TTI has a duration of one millisecond (ms) and includes N=14 OFDM symbols in the time domain (or two slots) and K Resource Blocks (RBs) in the frequency domain. A first type of Control CHannels (CCHs) is transmitted in a first $N_1$ OFDM symbols 410 (including no transmission, $N_1$=0). A remaining $N-N_1$ OFDM symbols are used primarily for transmitting PDSCHs 420 and, in some RBs of a TTI, for transmitting a second type of CCHs (ECCHs) 430. Each RB consists of $N_{SC}^{RB}$ sub-carriers, or Resource Elements (REs), and a UE is allocated $M_{PDSCH}$ RBs for a total of $M_{SC}^{PDSCH}=M_{PDSCH} \cdot N_{SC}^{RB}$ REs for the PDSCH transmission BW. A unit of 1 RB in frequency and of 1 slot in time is referred to as Physical RB (PRB).

Figure 5:
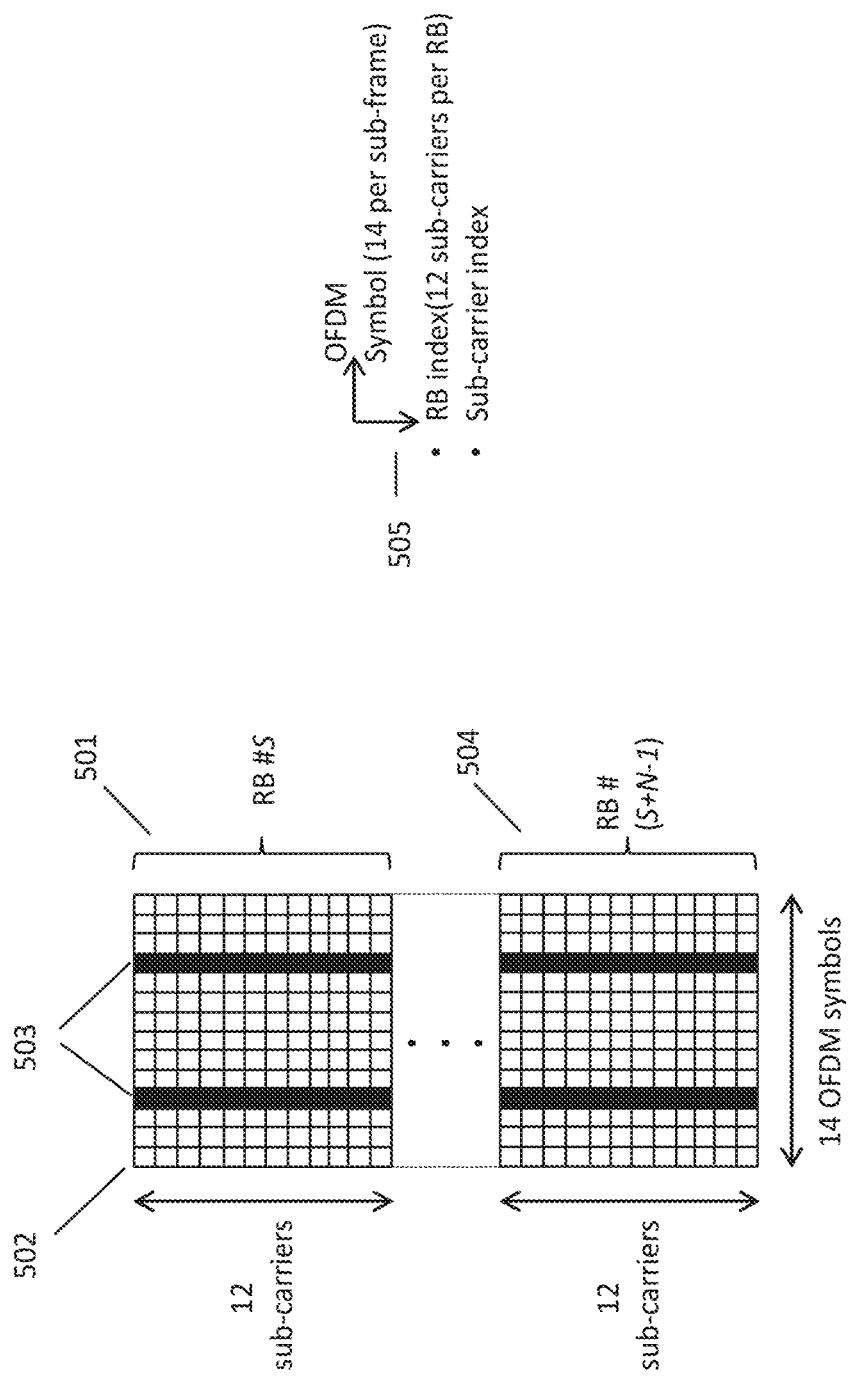
FIG. 5 illustrates an up-link allocation in the wireless communication system.

FIG. 5 illustrates an up-link allocation in the wireless communication system. A UE is allocated a set of N RBs (resource blocks) 501 to 504 numbered from S to S+N−1 in the example numbering of FIG. 5. Each RB consists of 12 sub-carriers in frequency and 14 OFDM symbols in time. The modulation samples representing the coded information being transmitted by the UE are placed in the PUSCH (packet up-link shared channel) region 502 in each RB; in FIG. 5, this is the un-shaded region in each RB. The DMRS (demodulation reference symbols) 503, which are the pilots used to demodulate the PUSCH, are placed in $4^{th}$ and $11^{th}$ OFDM symbol in each RB. The $1^{st}$ 7 OFDM symbols of the RB are referred to as belonging to Slot #0 of the RB, while the $2^{nd}$ set of 7 OFDM symbols are referred to as belonging to Slot #1 of the RB. Hence, the DMRS symbols 503 are placed in the 4th OFDM symbol in Slot #s 0 and 1 of the RB.

Figure 6:
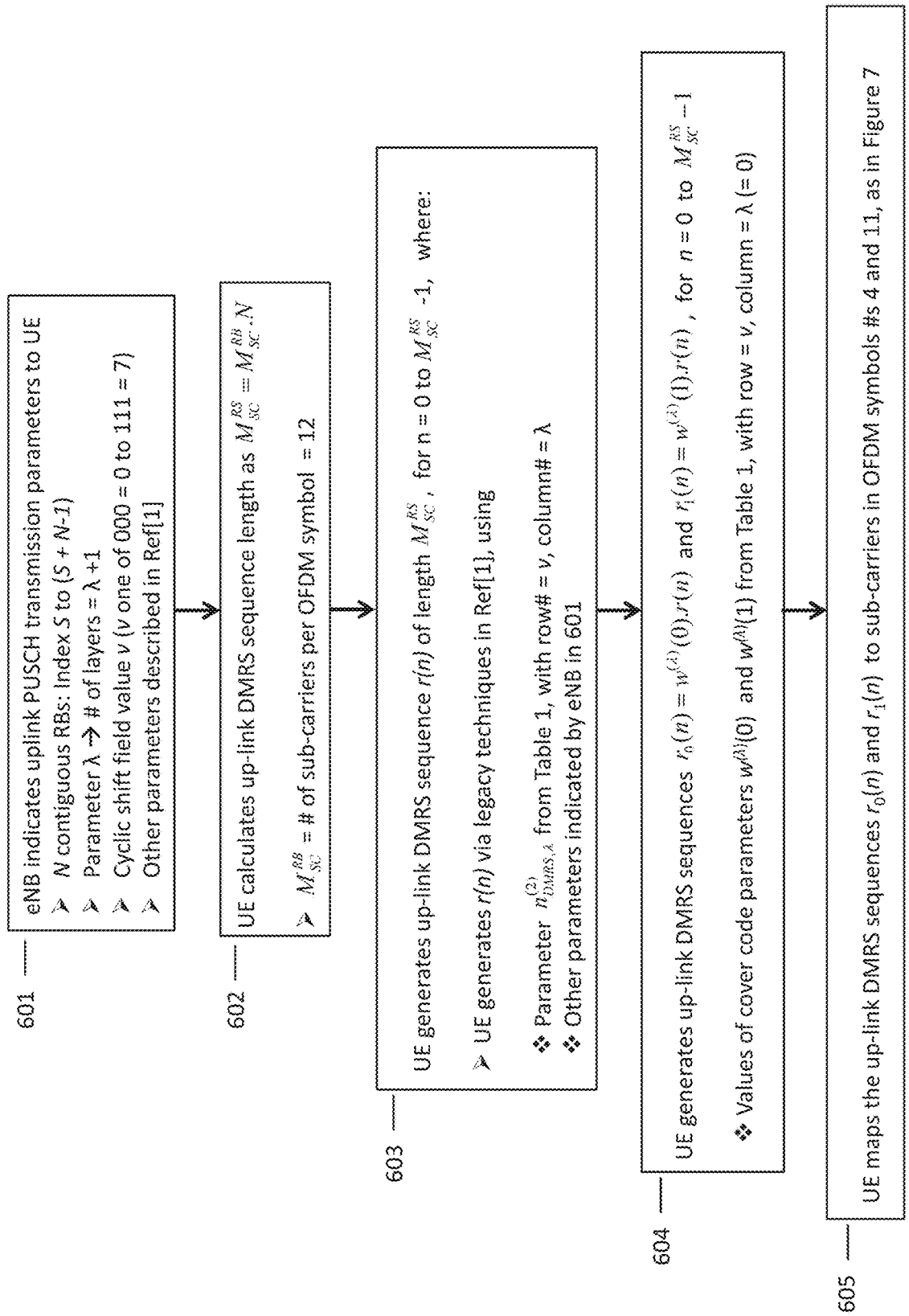
FIGS. 6 and 7 describe the procedures that enable the UE to determine the sequence value and placement within the uplink sub-frame of the uplink DMRS.
Figure 7:
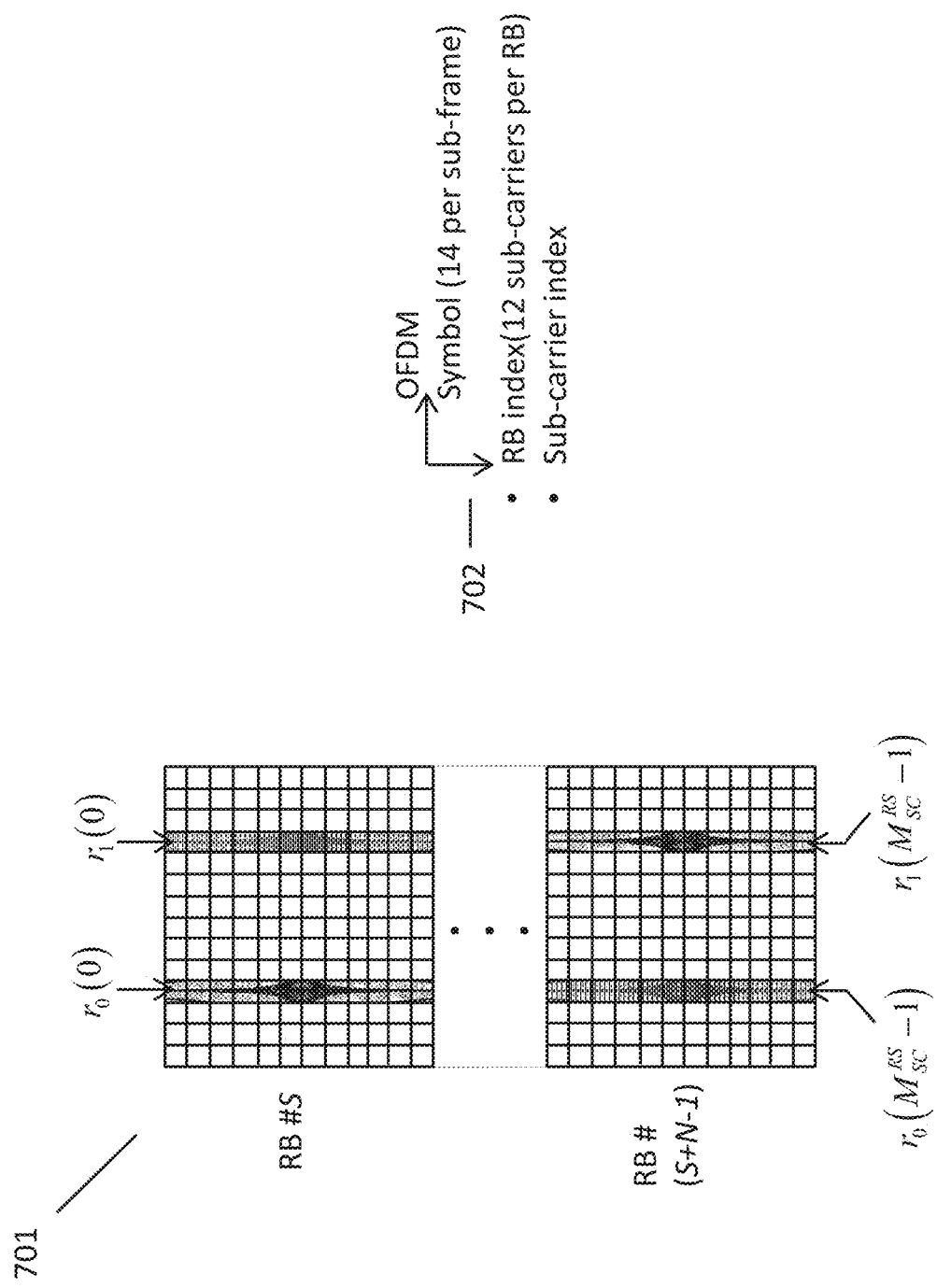

FIGS. 6 and 7 describe the procedures that enable the UE to determine the sequence value and placement within the uplink sub-frame of the uplink DMRS.

Table 1, which is referenced in the procedures described in FIGS. 6 and 7, is shown below.

Table 1: Cyclic Shift and OCC Indication Table

TABLE 1

| Cyclic Shift and OCC Indication Table | | | | | | | | |
|---|---|---|---|---|---|---|---|---|
| Cyclic Shift Field in uplink-related | $n^{(2)}_{DMRS,\lambda}$ | | | | $[w^{(\lambda)}(0)\ w^{(\lambda)}(1)]$ | | | |
| DCI format [3] | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

Referring to FIG. 6: 1. In step 601, the eNB indicates the uplink PUSCH transmission parameters to UE. These include the N contiguous RBs with indices S through (S+N−1), the parameter λ indicating the number of layers as (2+1), the cyclic shift field value v indexing each row of Table 1, as well as other parameters described in REF 1. The number of layers (X+1) can be at-most 4.

2. In step 602, the UE calculates the length of the up-link DMRS sequence as $M_{SC}^{RS}=M_{SC}^{RB} \cdot N$, where $M_{SC}^{RB}=12$ is the number of sub-carriers per OFDM symbol per RB.

3. In step 603, the UE generates the DMRS sequence r(n)], n=0, . . . , $M_{SC}^{RS}-1$, using: 3.a. the value of the parameter from Table 1 obtained from the row corresponding to the cyclic shift field value v and the column for the λ value among the set of columns corresponding to the $n_{DRMS,\lambda}^{(2)}$ parameter; and 3.b. the other parameters indicated by the eNB in (1) above.

4. In step 604, the UE generates the uplink DMRS sequences $r_0(n)=w(\lambda)w^{(\lambda)}(0) \cdot r(n)$ and $r_1(n)=w^{(\lambda)}(1) \cdot r(n)$ using the values of the cover code parameters $w^{(\lambda)}(0)$ and $w^{(\lambda)}(1)$ corresponding to the vth row and the column for the λ value among the set of columns corresponding to the $[w^{(\lambda)}(0)\ w^{(\lambda)}(1)]$ parameters of Table 1. It may be noted that $[w^{(\lambda)}(0)\ w^{(\lambda)}(1)]=[1\pm 1]$. $w^{(\lambda)}(0)$ and $w^{(\lambda)}(1)$ are the weights corresponding to the DMRS symbols in Slot #s 0 and 1 of the allocation.

In step 605, the UE then maps the generated sequences $r_0(n)$ and $r_1(n)$ to the uplink OFDM symbol grid as shown in FIG. 7. As in 701, the UE maps the values in the sequences $r_0(n)$ and $r_1(n)$ sequentially to the sub-carriers that make up the 4th and 11th OFDM symbols of the uplink sub-frame.

In order to perform the information reception operation, the receiver at the eNB performs up-link channel estimation via the received DMRS signals. A detailed description of this process is as follows.

Firstly, the frequency-domain uplink DMRS sequences for each symbol, with length equaling the number of REs per OFDM symbol in the allocation, denoted as $r_0(n)$ and $r^1(n)$ in the above description are as follows.

1. For allocations larger than 3 RBs, a ZC sequence is specified as the base frequency domain DMRS sequence; a CAZAC sequence is specified otherwise. The DMRS sequence corresponding to each layer is specified to be a cyclically-shifted version of the base sequence.

2. The, as in the above description, a cover code $[w^{(\lambda)}(0)\ w^{(\lambda)}(1)]$ of length 2, with possible values $[1, \pm 1]$, is specified. The DMRS sequence for each layer, multiplied by the 1st and 2nd cover code elements, is mapped to the 4th and 11th OFDM symbols, respectively.

In the case of a pair of completely overlapping PUSCH allocations, the corresponding pair of DMRS sequences are completely overlapping as well. Considering one of the DMRS symbols (either the 4th or the 11th), the different cyclic shifts applied to overlapping DMRS sequences yield a separation of the layer channel impulse responses (CIRs) in the time domain, enabling per-RE channel estimation for each sequence. A larger relative cyclic shift difference (modulo 12) yields a better CIR separation and better channel estimation performance; the largest possible such difference in the design in REF 1 is 6. It may be noted that the usage of the cyclic shift property to separately perform channel estimation on overlapping DMRS sequences is only possible in the case of a complete overlap.

In low-Doppler, i.e., low UE speed conditions, the channel coefficient corresponding to an certain sub-carrier can be considered to be almost constant across the OFDM symbols in sub-frame. Hence, in low-Doppler conditions, two DMRS sequences, possibly with the same cyclic shift but with orthogonal cover codes ([1, 1] and [1, −1]) and occupying the same RE can be separated by adding and subtracting the received composite DMRS signal for that RE in the 4th and 11th symbol. It may be noted that the usage of the orthogonal cover code (OCC) to separately perform channel estimation on overlapping DMRS sequences is possible in the case of a complete or a partial overlap.

A combination of different values of the DMRS sequence cyclic shifts and orthogonal cover codes may be used to multiplex up-to 2 UEs with up-to 2 layers each, with partially overlapping bandwidth allocations. For the specific case with 2 UEs with 2 layers each with partially overlapping bandwidth allocations, orthogonal cover codes would be used to separate the 2 layers of UE1 with respect to the 2 layers of UE2 over the overlapping portions of the allocation. This would then be followed, for each UE, by the usage of the different cyclic shifts for the layer DMRS sequences to perform channel estimation with respect to each layer separately.

As described above, the legacy techniques in REF 1 do not allow the ability to multiplex the DMRS sequences of more than 2 UEs with partially overlapping PUSCH allocations while maintaining acceptable up-link channel estimation performance. Such an ability would provide additional flexibility to the eNB and enhance the overall system performance on the up-link. This the present disclosure provides techniques to provide such UE multiplexing capability.

As mentioned in the earlier section, legacy techniques by which the UE determines the sequence values and position within the up-link subframe of the DMRS sequence do not allow the ability to multiplex the DMRS sequences of more than 2 UE with overlapping PUSCH allocations while maintaining acceptable up-link channel estimation performance. The present disclosure provides techniques to allow such a capability.

Embodiment Set 1: Extensions to Existing Cyclic Shift and OCC Indication Table

This set of embodiments discloses techniques to extend Table 1 by adding new parameters, while retaining the mappings and interpretations of the existing parameters, to allow the multiplexing of more than 2 UEs, each with possibly partially overlapping PUSCH allocations.

Embodiment Set 1.1: Support for Up-to 8 UE MU-MIMO with 1 Layer Per UE

This set of embodiments discloses techniques to extend the legacy Table 1 to enable the multiplexing of the UE DMRSs in the case that: up-to 8 UEs are allocated up-link PUSCH transmissions in the same sub-frame; each UE is allocated a single PUSCH layer on the up-link; and the UE PUSCH allocations may be un-equal and partially-overlapping. In an example situation, identifying two UEs, labeled as UE1 and UE2 from out of the set of UEs with PUSCH allocations in a given sub-frame, UE1 may be allocated a number N1 of contiguous RBs defined by starting and ending RB indices S1 and E1 respectively, whereas UE2 may be allocated a number N2 of contiguous RBs defined by starting and ending RB indices S2 and E2 respectively, where N1, S1 and E1 may or may not equal N2, S2 and E2.

Embodiment Set 1.1.1

For this set of embodiments, the legacy table is extended as shown in Table 2, by the addition of a column which defines, for each value of the cyclic shift field and for the specific case of the number of transmissions layers $(\lambda+1)=1$, two offset parameters, denoted by the symbols $O^{(\lambda)}(0)$ and $O^{(\lambda)}(1)$.

Table 2: Extension of existing indication table to support up-to 8 UE MU-MIMO with 1 layer per UE

TABLE 2

Extension of existing indication table to support up-to 8 UE MU-MIMO with 1 layer per UE

| Cyclic Shift Field in uplink-related DCI format [3] | $n^{(2)}_{DMRS,\lambda}$ | | | | $[w^{(\lambda)}(0)\ w^{(\lambda)}(1)]$ | | | | $[O^{(\lambda)}(0)\ O^{(\lambda)}(1)]$ |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | $\lambda=0$ |
| 000 | 0 | 6 | 3 | 9 | [1 1] | [1 1] | [1 −1] | [1 −1] | [0 0] |
| 001 | 6 | 0 | 9 | 3 | [1 −1] | [1 −1] | [1 1] | [1 1] | [0 0] |
| 010 | 3 | 9 | 6 | 0 | [1 −1] | [1 −1] | [1 1] | [1 1] | [0 0] |

TABLE 2-continued

Extension of existing indication table to support up-to 8 UE MU-MIMO with 1 layer per UE

| Cyclic Shift Field in uplink-related DCI format [3] | $n^{(2)}_{DMRS,\lambda}$ | | | | $[w^{(\lambda)}(0)\ w^{(\lambda)}(1)]$ | | | | $[O^{(\lambda)}(0)\ O^{(\lambda)}(1)]$ |
|---|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ | $\lambda = 0$ |
| 011 | 4 | 10 | 7 | 1 | [1 1] | [1 1] | [1 1] | [1 1] | [1 1] |
| 100 | 2 | 8 | 5 | 11 | [1 1] | [1 1] | [1 1] | [1 1] | [1 1] |
| 101 | 8 | 2 | 11 | 5 | [1 −1] | [1 −1] | [1 −1] | [1 −1] | [1 1] |
| 110 | 10 | 4 | 1 | 7 | [1 −1] | [1 −1] | [1 −1] | [1 −1] | [1 1] |
| 111 | 9 | 3 | 0 | 6 | [1 1] | [1 1] | [1 −1] | [1 −1] | [0 0] |

The added column has been highlighted at the right end in Table 2.

Figure 8:
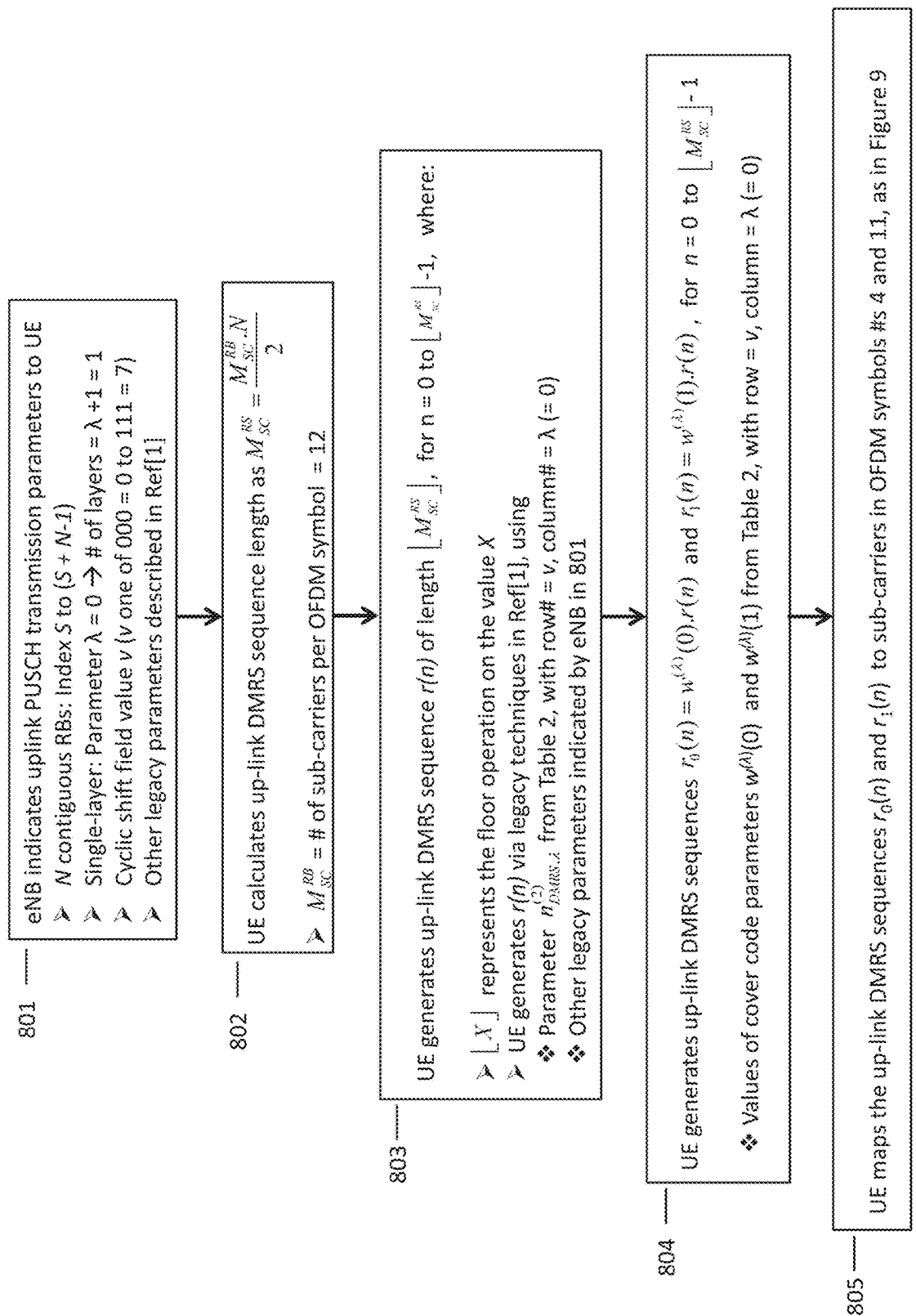
FIGS. 8 and 9 illustrate the UE operation with respect to determining the uplink DMRS sequences to use and their positions in the allocated RBs according to embodiments of the present disclosure.
Figure 9:
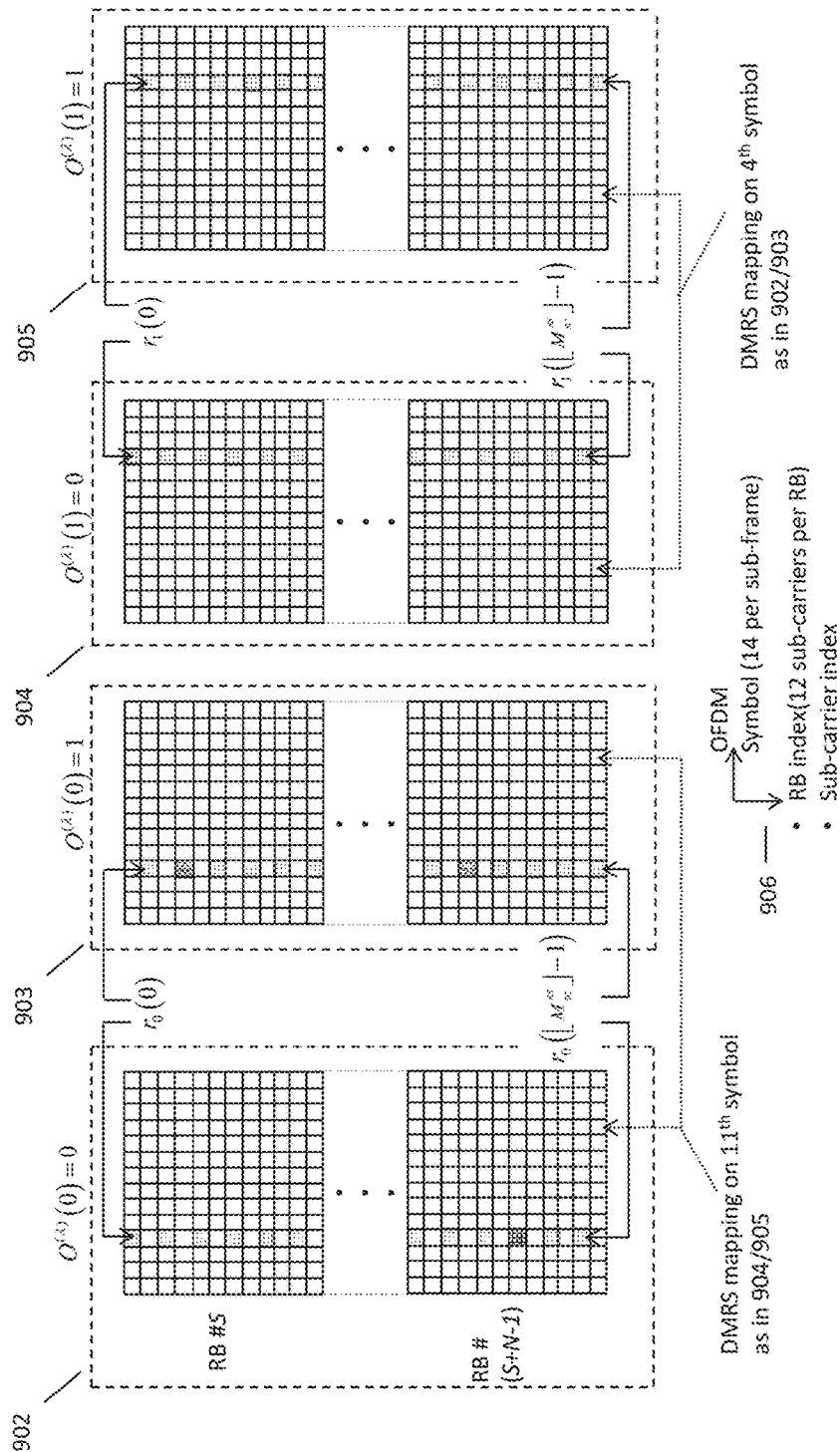

FIGS. 8 and 9 illustrate the UE operation with respect to determining the uplink DMRS sequences to use and their positions in the allocated RBs according to embodiments of the present disclosure.

The motivation for this embodiment can be understood as follows. As explained earlier, the receiver at the eNB performs up-link channel estimation via the received DMRS signals. A combination of different values of the DMRS sequence cyclic shifts and orthogonal cover codes may be used to multiplex up-to 2 UEs with up-to 2 layers each, with partially overlapping bandwidth allocations. For the specific case with 2 UEs with 2 layers each with partially overlapping bandwidth allocations, orthogonal cover codes would be used to separate the 2 layers of UE1 with respect to the 2 layers of UE2 over the overlapping portions of the allocation. This would then be followed, for each UE, by the usage of the different cyclic shifts for the layer DMRS sequences to perform channel estimation with respect to each layer separately.

Since the cover codes have length 2, such an orthogonal separation of the UE DMRS irrespective of whether or not they are fully overlapping is only possible for up-to 2 UEs.

These embodiments disclose a technique to increase the number of UEs whose DMRS sequences can be orthogonally separated via the usage of a comb structure for the DMRS, whereby the DMRS of different UEs can occupy non-overlapping resources irrespective of whether the corresponding allocated PUSCH resources are overlapping or non-overlapping. This is achieved by placing the DMRS sequence values at every other sub-carrier of the DMRS symbols as illustrated in 902/903/904/905 of FIG. 9, instead of at every sub-carrier of the DMRS symbols as in the legacy design in REF 1. The offset parameter values $O^{(\lambda)}(0)$ and $O^{(\lambda)}(1)$, with $(\lambda+1)$ denoting the number of layers, determine the starting sub-carrier for the DMRS sequence placement in the DMRS symbols in Slot #s 0 and 1 of each RB in the allocation, respectively.

Referring to FIG. 8, the detailed operation with respect to this embodiment set is as follows.

1. In step 801, the eNB indicates the uplink PUSCH transmission parameters to UE. These include the N contiguous RBs with indices S through (S+N−1), the parameter λ indicating the number of layers as (λ+1), the cyclic shift field value v indexing each row of Table 2, as well as other legacy parameters described in REF 1. In this set of embodiments, $\lambda=0$ so that the number of indicated layers as $(\lambda+1)=1$.

2. In step 802, the UE calculates the length of the up-link DMRS sequence as $M_{SC}^{RS}=M_{SC}^{RB} \cdot N/2$, where M=12 is the number of sub-carriers per OFDM symbol per RB.

3. In step 803, the UE generates the DMRS sequence r(n), with n=0, ... $\lfloor M_{SC}^{RS} \rfloor - 1$, where $\lfloor x \rfloor$ represents the floor value of the parameter x, using: 3.a. the value of the $n_{DMRS,\lambda}^{(2)}$ parameter obtained from the row corresponding to the cyclic shift field value v and the $\lambda=0$ column of the set of columns corresponding to the $n_{DMRS,\lambda}^{(2)}$ parameter, and 3.b the other legacy parameters indicated by the eNB in (1) above.

4. In step 804, the UE generates the uplink DMRS sequences $r_0(n)=w^{(\lambda)}(0) \cdot r(n)$ and $r_1(n)=w^{(\lambda)}(1) \cdot r(n)$ using the values of the cover code parameters $w^{(\lambda)}(0)$ and $w^{(\lambda)}(1)$ corresponding to the vth row and the $\lambda=0$ column of the set of columns corresponding to the $[w^{(\lambda)}(0)\ w^{(\lambda)}(1)]$ parameters of Table 2.

In step 805, the UE then maps the generated sequences $r_0(n)$ and $r_1(n)$ to the uplink OFDM symbol grid as shown in FIG. 9.

FIG. 9 illustrates an example mapping of the generated sequences $r_0(n)$ and $r_1(n)$ to the uplink OFDM symbol grid according to embodiments of the present disclosure.

As shown in 901, the mapping rule is based on the offset parameters $O^{(\lambda)}(0)$ and $O^{(\lambda)}(1)$, as follows. These offset parameters are determined from the row corresponding to the cyclic shift field value v and the ($\lambda=0$) column corresponding to the $[O^{(\lambda)}(0)\ O^{(\lambda)}(1)]$ parameters of Table 2.

1. As shown in FIG. 9, each RB consists of 12 sub-carriers in frequency and 14 OFDM symbols in time. The sequences $r_0(n)$ and $r_1(n)$ are mapped to the sub-carriers in the 4th and 11th OFDM symbol of each of the N RBs in the allocation, respectively.

2. The offset parameter $O^{(\lambda)}(0)$ is used to map the sequence $r_0(n)$ to the 4th OFDM symbol of each of the NRBs in the allocation.

3. In one embodiment sub-set of this embodiment set, sub-carriers in an OFDM symbol are indexed sequentially, with adjacent sub-carriers being assigned adjacent integer values. Further, sub-carrier indexing follows the RB indexing such that if $n_{Highest}$ is the highest sub-carrier index in any OFDM symbol of an RB with a certain RB index R, then the lowest sub-carrier index in the next higher RB index (R+1) is $n_{Highest}+1$. Then the following processes take place:

3.a. The sequence $r_0(n)$ is mapped to the alternate sub-carriers of the 4th OFDM symbol, starting from the lowest indexed or 2nd lowest indexed sub-carrier of the lowest indexed RB, if $O^{(\lambda)}(0)=0$ or $O^{(\lambda)}(0)=1$, respectively, as illustrated in 902 and 903 of FIG. 9.

3.a.i. Alternatively, the sequence $r_0(n)$ is mapped to the alternate sub-carriers of the 4th OFDM symbol, starting from the highest indexed or 2nd highest indexed sub-carrier of the highest indexed RB, if $O^{(\lambda)}(0)=0$ or $O^{(\lambda)}(0)=1$, respectively.

3.a.ii. Alternatively, the sequence $r_0(n)$ is mapped to the alternate sub-carriers of the 4th OFDM symbol, starting from the lowest indexed or $2^{nd}$ lowest indexed sub-carrier of the lowest indexed RB, if $O^{(\lambda)}(0)=1$ or $O^{(\lambda)}(0)=0$, respectively.

3.a. iii. Alternatively, the sequence $r_0(n)$ is mapped to the alternate sub-carriers of the $4^{th}$ OFDM symbol, starting from the highest indexed or $2^{nd}$ highest indexed sub-carrier of the highest indexed RB, if $O^{(\lambda)}(0)=1$ or $O^{(\lambda)}(0)=0$, respectively.

3.b. The sequence $r_1(n)$ is mapped to the alternate sub-carriers of the $11^{th}$ OFDM symbol, starting from the lowest indexed or $2^{nd}$ lowest indexed sub-carrier of the lowest indexed RB, if $O^{(\lambda)}(1)=0$ or $O^{(\lambda)}(1)=1$, respectively, as illustrated in 904 and 905 of FIG. 9.

3.b.i. Alternatively, the sequence $r_1(n)$ is mapped to the alternate sub-carriers of the $11^{th}$ OFDM symbol, starting from the highest indexed or $2^{nd}$ highest indexed sub-carrier of the highest indexed RB, if $O^{(\lambda)}(1)=0$ or $O^{(\lambda)}(1)=1$, respectively.

3.b.ii. Alternatively, the sequence $r_1(n)$ is mapped to the alternate sub-carriers of the $11^{th}$ OFDM symbol, starting from the lowest indexed or $2^{nd}$ lowest indexed sub-carrier of the lowest indexed RB, if $O^{(\lambda)}(1)=1$ or $O^{(\lambda)}(1)=0$, respectively.

3.b.iii. Alternatively, the sequence $r_0(n)$ is mapped to the alternate sub-carriers of the $4^{th}$ OFDM symbol, starting from the highest indexed or $2^{nd}$ highest indexed sub-carrier of the highest indexed RB, if $O^{(\lambda)}(1)=1$ or $O^{(\lambda)}(1)=0$, respectively.

Alternate embodiments may be derived by replacing each occurrence of $[O^{(\lambda)}(0)\ O^{(\lambda)}(1)]=[0\ 0]$ by $[1\ 1]$ and each occurrence of $[O^{(\lambda)}(0)\ O^{(\lambda)}(1)]=[1\ 1]$ by $[0\ 0]$ in the last column of Table 2.

Embodiment Set 1.1.2

For this set of embodiments, as in Embodiment Set 1.1.1, the legacy table is extended by the addition of a column which defines, for each value of the cyclic shift field and for the specific case of the number of transmissions layers $(\lambda+1)=1$, two offset parameters, denoted by the symbols $O^{(\lambda)}(0)$ and $O^{(\lambda)}(1)$. The resulting table is illustrated in Table 3.

Table 3: Extension of existing indication table to support up-to 8 UE MU-MIMO with 1 layer per UE DMRS of different UEs can occupy non-overlapping resources irrespective of whether the corresponding allocated PUSCH resources are overlapping or non-overlapping. This is achieved by placing the DMRS sequence values at every third sub-carrier of the DMRS symbols as illustrated in 902/903/904/905 of FIG. 9, instead of at every sub-carrier of the DMRS symbols as in the legacy design in REF 1. The offset parameter values $O^{(\lambda)}(0)$ and $O^{(\lambda)}(1)$, with (+1) denoting the number of layers, determine the starting sub-carrier for the DMRS sequence placement in the DMRS symbols in Slot #s 0 and 1 of each RB in the allocation, respectively.

Figure 10:
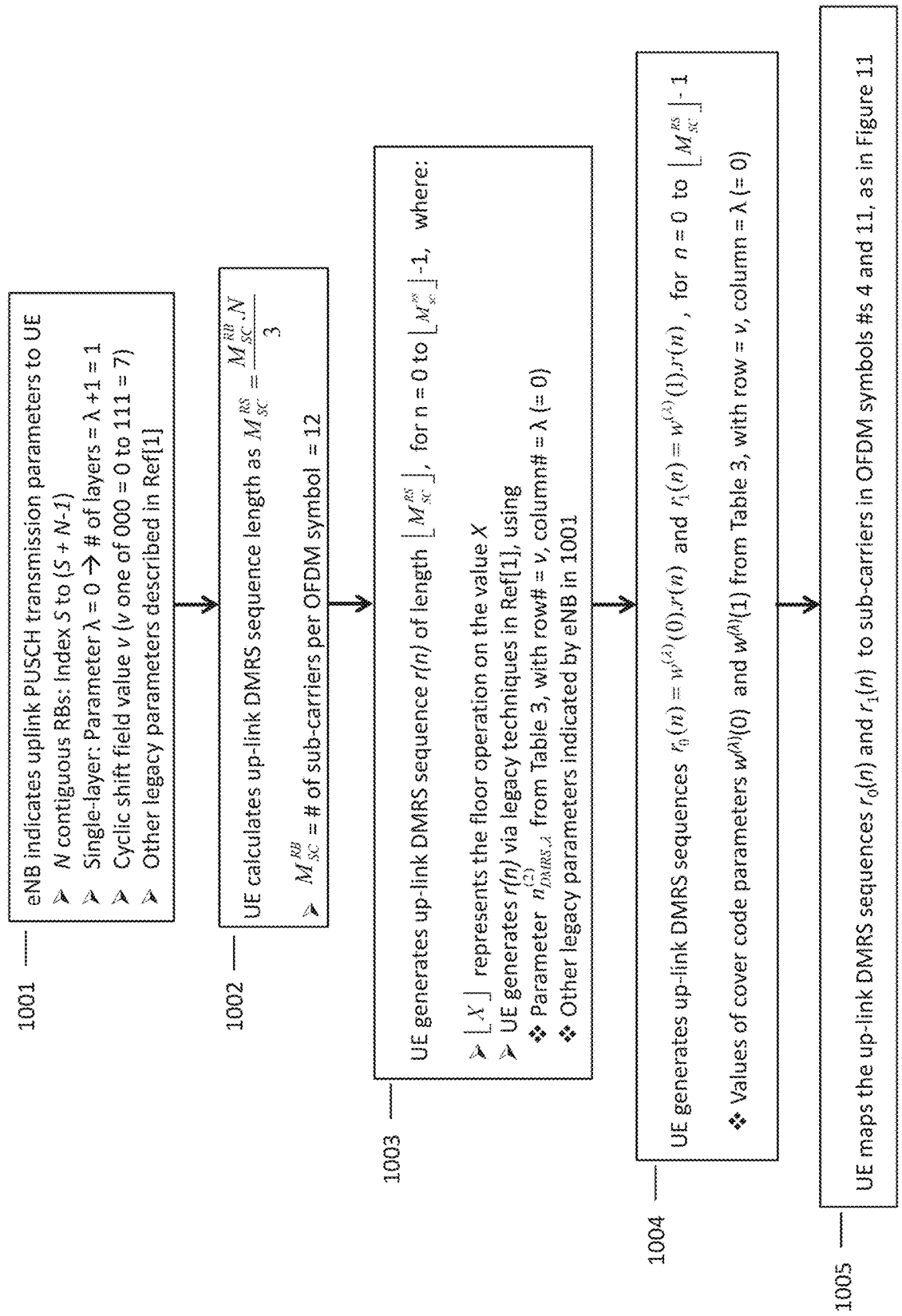
FIGS. 10, 11A, and 11B illustrate an example UE operation with respect to determining the uplink DMRS sequences to use and their positions in the allocated RBs according to the embodiments of the present disclosure.
Figure 11A:
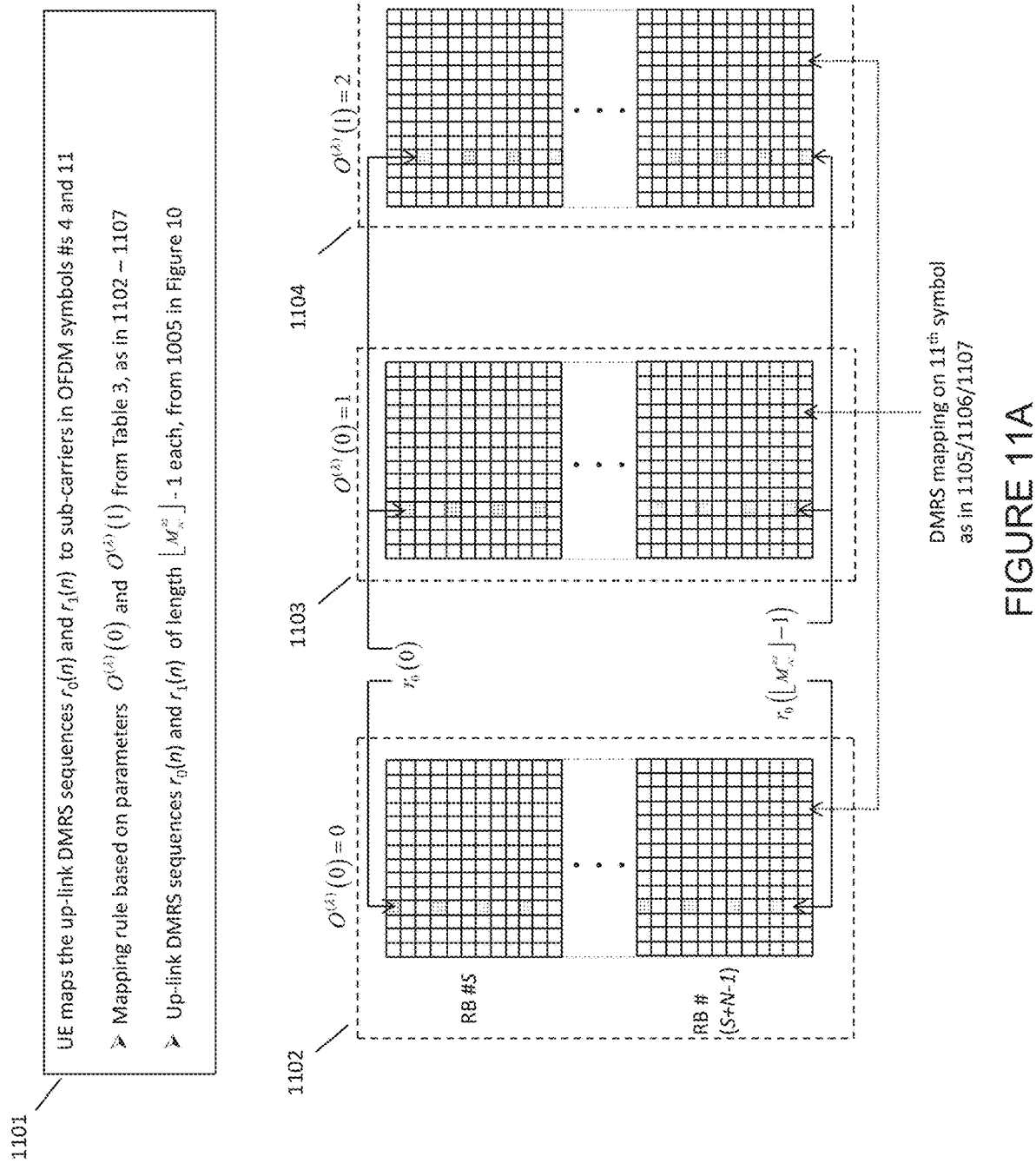
Figure 11B:
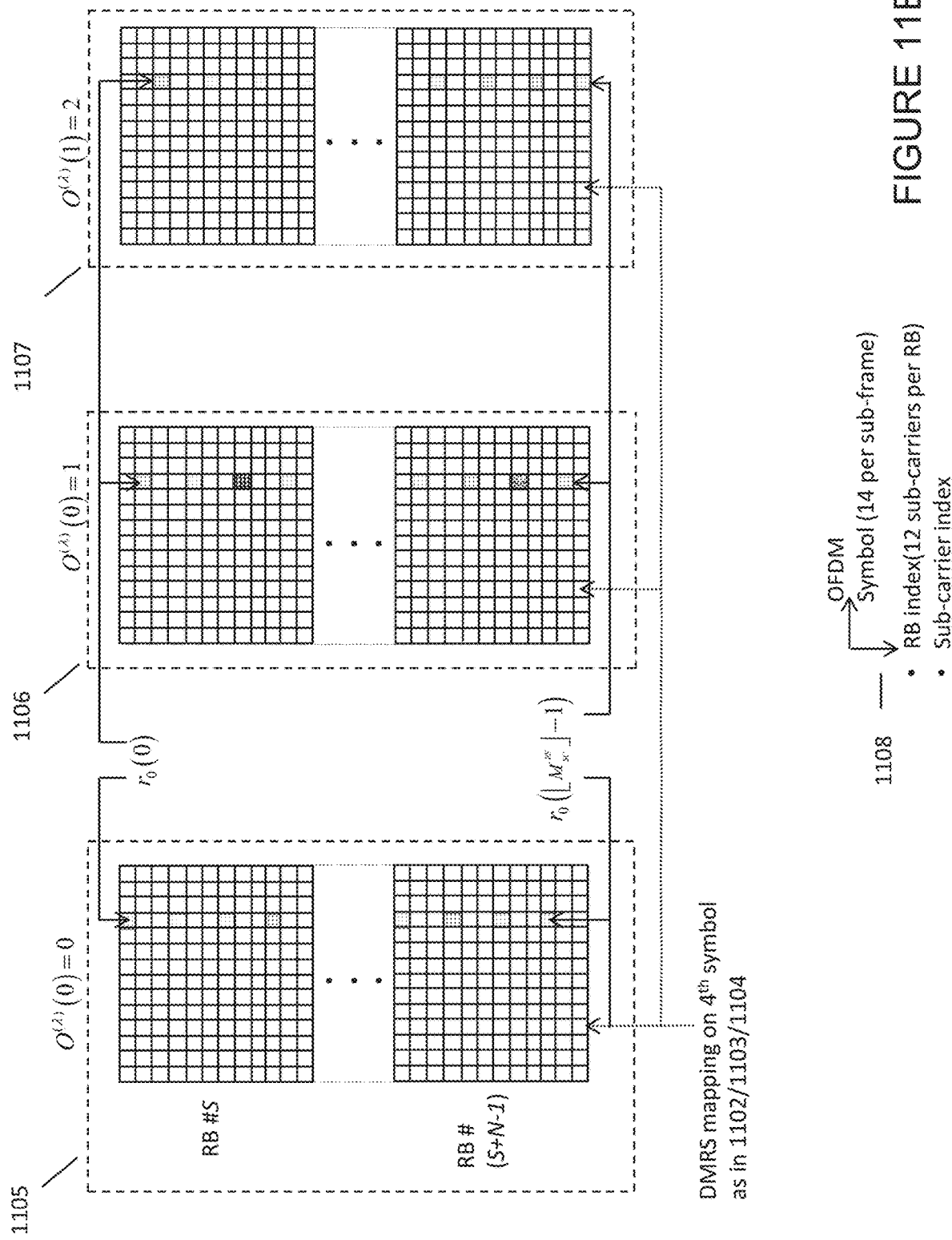

FIGS. 10, 11A, and 11B illustrate example UE operations with respect to determining the uplink DMRS sequences to use and their positions in the allocated RBs according to the embodiments of the present disclosure.

1. Referring to FIG. 10, in step 1001, the eNB indicates the uplink PUSCH transmission parameters to UE. These include the N contiguous RBs with indices S through (S+N−1), the parameter $\lambda$ indicating the number of layers as ($\lambda$+1), the cyclic shift field value v indexing each row of Table 3, as well as other legacy parameters described in REF 1. In this set of embodiments, $\lambda=0$ so that the number of indicated layers as ($\lambda$+1)=1.

2. In step 1002, the UE calculates the length of the up-link DMRS sequence as $M_{SC}^{RS}=M_{SC}^{RB}\cdot N/3$, where $M_{SC}^{RB}=12$ is the number of sub-carriers per OFDM symbol per RB 3. In step 1003, the UE generates the DMRS sequence $r(n)$, with $n=0,\ldots,\lfloor M_{SC}^{RS}\rfloor-1$, where $\lfloor x \rfloor$ represents the floor value of the parameter x, using: 3.a The value of the $n_{DMRS,\lambda}^{(2)}$ parameter obtained from the row corresponding to the cyclic shift field value v and the $\lambda=0$ column of the set of columns corresponding to $n_{DMRS,\lambda}^{(2)}$ the parameter; and 3.b The other legacy parameters indicated by the eNB in (1) above.

4. In step 1004, the UE generates the uplink DMRS sequences $r_0(n)=w^{(\lambda)}(0)\cdot r(n)$ and $r_1(n)=w^{(\lambda)}(1)\cdot r(n)$ using the values of the cover code parameters $w^{(\lambda)}(0)$ and $w^{(\lambda)}(1)$ corresponding to the vth row and the $\lambda=0$ column of the set of columns corresponding to the $[w^{(\lambda)}(0)\ w^{(\lambda)}(1)]$ parameters of Table 2.

In step 1005, the UE then maps the generated sequences $r_0(n)$ and $r_1(n)$ to the uplink OFDM symbol grid as shown in FIG. 11A. As in 1101, the mapping rule is based on the offset

TABLE 3

Extension of existing indication table to support up-to 8 UE MU-MIMO with 1 layer per UE

| Cyclic Shift Field in uplink-related DCI format [3] | $n^{(2)}_{DMRS,\lambda}$ | | | | $[w^{(\lambda)}(0)\ w^{(\lambda)}(1)]$ | | | | $[O^{(\lambda)}(0)\ O^{(\lambda)}(1)]$ |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | $\lambda=0$ |
| 000 | 0 | 6 | 3 | 9 | [1 1] | [1 1] | [1 −1] | [1 −1] | [0 0] |
| 001 | 6 | 0 | 9 | 3 | [1 −1] | [1 −1] | [1 1] | [1 1] | [0 0] |
| 010 | 3 | 9 | 6 | 0 | [1 −1] | [1 −1] | [1 1] | [1 1] | [0 0] |
| 011 | 4 | 10 | 7 | 1 | [1 1] | [1 1] | [1 1] | [1 1] | [1 1] |
| 100 | 2 | 8 | 5 | 11 | [1 1] | [1 1] | [1 1] | [1 1] | [1 1] |
| 101 | 8 | 2 | 11 | 5 | [1 −1] | [1 −1] | [1 −1] | [1 −1] | [1 1] |
| 110 | 10 | 4 | 1 | 7 | [1 −1] | [1 −1] | [1 −1] | [1 −1] | [1 1] |
| 111 | 9 | 3 | 0 | 6 | [1 1] | [1 1] | [1 −1] | [1 −1] | [0 0] |

The added column has been highlighted at the right end in Table 3.

The motivation for this set of embodiments is similar to those of Embodiment Set 1.1.1. These embodiments disclose a technique to increase the number of UEs whose DMRS sequences can be orthogonally separated via the usage of a comb structure for the DMRS, whereby the parameters $O^{(\lambda)}(0)$ and $O^{(\lambda)}(1)$, as follows. These offset parameters are determined from the row corresponding to the cyclic shift field value v and the (') column corresponding to the $O^{(\lambda)}(0)\ O^{(\lambda)}(1)$ parameters of Table 3.

1. As in FIG. 11A, each RB consists of 12 sub-carriers in frequency and 14 OFDM symbols in time. The sequences $r_0(n)$ and $r_1(n)$ are mapped to the sub-carriers in the 4th and 11th OFDM symbol of each of the N RBs in the allocation, respectively.

2. The offset parameter $O^{(\lambda)}(0)$ is used to map the sequence $r_0(n)$ to the 4th OFDM symbol of each of the N RBs in the allocation.

3. In one embodiment sub-set of this embodiment set, sub-carriers in an OFDM symbol are indexed sequentially, with adjacent sub-carriers being assigned adjacent integer values. Further, sub-carrier indexing follows the RB indexing such that if $n_{Highest}$ is the highest sub-carrier index in any OFDM symbol of an RB with a certain RB index R, then the lowest sub-carrier index in the next higher RB index (R+1) is $n_{Highest}+1$. Then:

3.a. The sequence $r_0(n)$ is mapped to the alternate sub-carriers of the 4th OFDM symbol, starting from the lowest indexed, 2nd lowest indexed or 3rd lowest indexed sub-carrier of the lowest indexed RB, if $O^{(\lambda)}(0)=0$, $O^{(\lambda)}(0)=1$ or $O^{(\lambda)}(0)=2$, respectively, as illustrated in 1102, 1103 and 1104 of FIG. 11A.

3.a.i. Alternatively, the sequence $r_0(n)$ is mapped to the alternate sub-carriers of the 4th OFDM symbol, starting from the highest indexed, $2^{nd}$ highest or $3^{rd}$ highest indexed sub-carrier of the highest indexed RB, if $O^{(\lambda)}(0)=0$, $O^{(\lambda)}(0)=1$ or $O^{(\lambda)}(0)=2$, respectively.

3.a.ii. Alternatively, the sequence $r_0(n)$ is mapped to the alternate sub-carriers of the 4th OFDM symbol, starting from the lowest indexed, 2nd lowest indexed or 3rd lowest indexed sub-carrier of the lowest indexed RB, if $O^{(\lambda)}(0)=2$, $O^{(\lambda)}(0)=1$ or $O^{(\lambda)}(0)=0$, respectively.

3.a.iii. Alternatively, the sequence $r_0(n)$ is mapped to the alternate sub-carriers of the 4th OFDM symbol, starting from the highest indexed or 2nd highest indexed sub-carrier of the highest indexed RB, if, if $O^{(\lambda)}(0)=2$, $O^{(\lambda)}(0)=1$ or $O^{(\lambda)}(0)=0$, respectively.

3.b. The sequence $r_1(n)$ is mapped to the alternate sub-carriers of the 11th OFDM symbol, starting from the lowest indexed, 2nd lowest indexed or 3rd lowest indexed sub-carrier of the lowest indexed RB, if $O^{(\lambda)}(0)=0$, $O^{(\lambda)}(0)=1$ or $O^{(\lambda)}(0)=2$, respectively, as illustrated in 1105, 1106 and 1107 of FIG. 11B.

3.b.i. Alternatively, the sequence $r_1(n)$ is mapped to the alternate sub-carriers of the 11th OFDM symbol, starting from the highest indexed, 2nd highest or 3rd highest indexed sub-carrier of the highest indexed RB, if $O^{(\lambda)}(0)=2$, $O^{(\lambda)}(0)=1$ or $O^{(\lambda)}(0)=0$, respectively.

3.b.ii. Alternatively, the sequence $r_1(n)$ is mapped to the alternate sub-carriers of the 11th OFDM symbol, starting from the lowest indexed, 2nd lowest indexed or 3rd lowest indexed sub-carrier of the lowest indexed RB, if $O^{(\lambda)}(0)=0$, $O^{(\lambda)}(0)=1$ or $O^{(\lambda)}(0)=2$, respectively.

3.b.iii. Alternatively, the sequence $r_1(n)$ is mapped to the alternate sub-carriers of the 11th OFDM symbol, starting from the highest indexed or 2nd highest indexed sub-carrier of the highest indexed RB, if, if $O^{(\lambda)}(0)=2$, $O^{(\lambda)}(0)=1$ or $O^{(\lambda)}(0)=0$, respectively.

Alternate embodiments may be derived by the following changes to the last column (the column defining the values of the $[O^{(\lambda)}(0) \ O^{(\lambda)}(1)]$ parameters for the $\lambda=0$ case for various values of the cyclic shift field) of Table 3: (1) Replacing each occurrence of 0 by 1; (2) Replacing each occurrence of 0 by 2; (3) Replacing each occurrence of (1) by (2); and (4) Successive repetitions of (1), (2) and (3) above in any order.

Embodiment Set 2: Modifications to Existing Cyclic Shift and OCC Indication Table This set of embodiments discloses techniques to allow the multiplexing of more than 2 UEs, each with possibly non-overlapping PUSCH allocations, by extending Table 1 by adding new parameters, while also modifying some of the mappings and interpretations of the existing parameters.

Embodiment Set 2.1: Support for Up-to 8 UE MU-MIMO with 1 Layer Per UE

This set of embodiments discloses techniques to enable the multiplexing of the UE DMRSs in the case that: up-to 8 UEs are allocated up-link PUSCH transmissions in the same sub-frame; and each UE is allocated a single PUSCH layer on the up-link.

The UE PUSCH allocations may be un-equal and partially-overlapping. In an example situation, identifying two UEs, labeled as UE1 and UE2 from out of the set of UEs with PUSCH allocations in a given sub-frame, UE1 may be allocated a number N1 of contiguous RBs defined by starting and ending RB indices S1 and E1 respectively, whereas UE2 may be allocated a number N2 of contiguous RBs defined by starting and ending RB indices S2 and E2 respectively, where N1, S1 and E1 may or may not equal N2, S2 and E2.

Since the following embodiment sub-sets disclose techniques applicable to the single-layer case, only the columns of the modified Table 1, corresponding to the single layer case and identified by the parameter setting 2=0, are shown in the tables in the embodiment sub-sets.

Embodiment Set 2.1.1

The indication table in this set of embodiments is shown in Table 4.

Table 4: Modification of existing indication table to support up-to 8 UE MU-MIMO with 1 layer per UE

TABLE 4

| Modification of existing indicatin table to support up-to 8 UE MU-MIMO with 1 layer per UE | | | |
|---|---|---|---|
| Cyclic Shift Field in uplink-related DCI format [3] | $n^{(2)}_{DMRS, \lambda}$ for $\lambda = 0$ | $[w^{(\lambda)}(0) \ w^{(\lambda)}(1)]$ for $\lambda = 0$ | $[O^{(\lambda)}(0) \ O^{(\lambda)}(1)]$ for $\lambda = 0$ |
| 000 | 0 | [1 1] | [0 0] |
| 001 | 6 | [1 1] | [0 0] |
| 010 | 3 | [1 −1] | [0 0] |
| 011 | 5 | [1 −1] | [1 1] |
| 100 | 2 | [1 1] | [1 1] |
| 101 | 8 | [1 1] | [1 1] |
| 110 | 11 | [1 −1] | [1 1] |
| 111 | 9 | [1 −1] | [0 0] |

The UE operation with respect to determining the uplink DMRS sequences to use and their positions in the allocated RBs is as described in FIGS. 8 and 9 and the description about the UE operation with respect to Embodiment Set 1.1.1, with "Table 2" being replaced by "Table 4" in the FIGURES/descriptions.

Embodiment Set 2.1.2

The indication table in this set of embodiments is shown in Table 5.

Table 5. Modification of existing indication table to support up-to 8 UE MU-MIMO with 1 layer per UE

TABLE 5

Modification of existing indicatin table to support
up-to 8 UE MU-MIMO with 1 layer per UE

| Cyclic Shift Field in uplink-related DCI format [3] | $n^{(2)}_{DMRS, \lambda}$ for $\lambda = 0$ | $[w^{(\lambda)}(0)\ w^{(\lambda)}(1)]$ for $\lambda = 0$ | $[O^{(\lambda)}(0)\ O^{(\lambda)}(1)]$ for $\lambda = 0$ |
|---|---|---|---|
| 000 | 0 | [1 1] | [0 0] |
| 001 | 6 | [1 1] | [0 0] |
| 010 | 3 | [1 −1] | [0 0] |
| 011 | 5 | [1 −1] | [1 1] |
| 100 | 2 | [1 1] | [1 1] |
| 101 | 8 | [1 1] | [1 1] |
| 110 | 11 | [1 −1] | [1 1] |
| 111 | 9 | [1 −1] | [0 0] |

The UE operation with respect to determining the uplink DMRS sequences to use and their positions in the allocated RBs is as described in FIGS. 8 and 9 and the description about the UE operation with respect to Embodiment Set 1.1.1, with "Table 2" being replaced by "Table 5" in the FIGURES/descriptions.

The present disclosure also relates generally to wireless communication systems and, more specifically, to support signaling of quasi-colocation of antenna ports or beams for transmissions from user equipments (UEs) to a base station or for transmissions from a base station to UEs. Depending on the network type, the term "base station" or "BS" can refer to any component (or collection of components) configured to provide wireless access to a network, such as transmit point (TP), transmit-receive point (TRP), an enhanced base station (eNodeB or eNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine). A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

For a communication system such as Long Term Evolution (LTE), signaling to indicate quasi co-location of antenna ports was introduced in order to improve the quality of channel estimation based on demodulation RS (DMRS) and PDSCH reception. In LTE, two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

Two types of QCL of antenna ports for PDSCH (antenna port 7-14) are defined in LTE. Type A: The UE may assume the antenna ports 0-3 (CRS ports), 7-30 (DM-RS ports and CSI-RS ports) of a serving cell are quasi co-located with respect to delay spread, Doppler spread, Doppler shift, and average delay. Type B: The UE may assume the antenna ports 15-30 (CSI-RS ports) corresponding to the CSI-RS resource configuration configured by the higher layers and the antenna ports 7-14 (DM-RS ports) associated with the PDSCH are quasi co-located with respect to Doppler shift, Doppler spread, average delay, and delay spread.

Type A QCL is beneficial for supporting communications without transmission from multiple points to the same UE, while Type B QCL is beneficial for communications with coordinated multiple-point (CoMP) transmissions, such as dynamic point selection (DPS).

To enable dynamic indication of quasi co-location information in LTE, a UE configured in transmission mode 10 for a given serving cell can be configured with up to 4 parameter sets by higher layer signaling to decode PDSCH according to a detected PDCCH/EPDCCH with DCI format 2D intended for the UE and the given serving cell. The UE shall use the parameter set according to the value of the 'PDSCH RE Mapping and Quasi-Co-Location indicator' field in the detected PDCCH/EPDCCH with DCI format 2D for determining the PDSCH RE mapping, and for determining PDSCH antenna port quasi co-location if the UE is configured with Type B quasi co-location type. The parameter set comprises of quasi co-located CRS information (with respect to Doppler shift, and Doppler spread), the quasi co-located CSI-RS configurations and the starting OFDM symbol for PDSCH and the MBSFN subframe configuration.

Rel.13 LTE supports up to 16 CSI-RS antenna ports which enable an eNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 12:
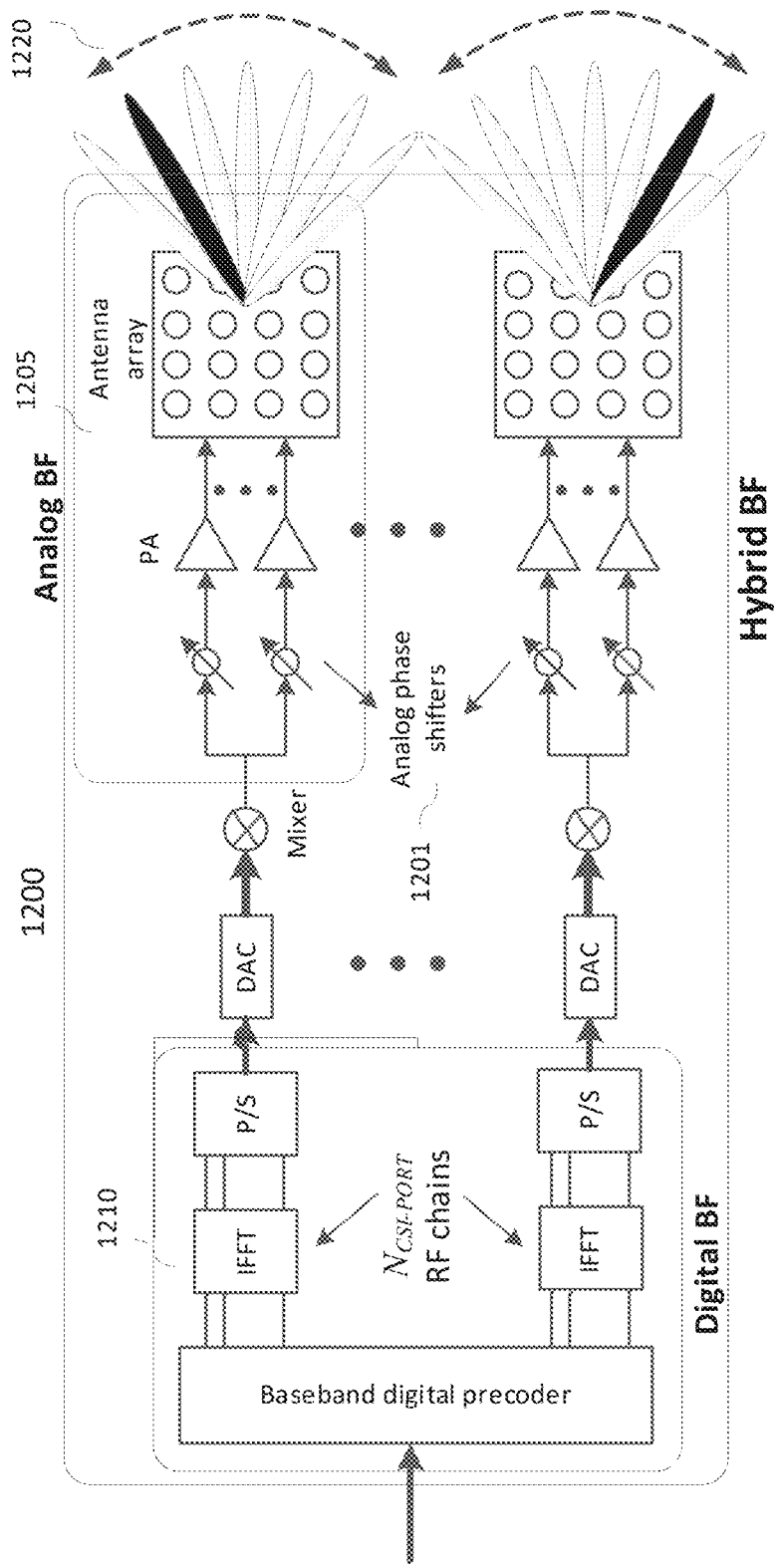
FIG. 12 illustrates an example transceiver 1200 comprising a large number of antenna elements according to embodiments of the present disclosure.

FIG. 12 illustrates an example transceiver 1200 comprising a large number of antenna elements according to embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 12.

In this case, one CSI-RS port is mapped onto a large number of antenna elements which can be controlled by a bank of analog phase shifters 1201. One CSI-RS port can then correspond to one sub-array which produces a narrow analog beam through analog beamforming 1205. This analog beam can be configured to sweep across a wider range of angles (1220) by varying the phase shifter bank across symbols or subframes. The number of sub-arrays (equal to the number of RF chains) is the same as the number of CSI-RS ports NCSI-PORT. A digital beamforming unit 1210 performs a linear combination across NCSI-PORT analog beams to further increase precoding gain. While analog beams are wideband (hence not frequency-selective), digital precoding can be varied across frequency sub-bands or resource blocks.

The present disclosure addresses a need to specify a new antenna ports/beams quasi co-location framework and the corresponding signalling methods for 5G or NR communication systems.

For 5G or NR communication systems, a new reference signal (RS) can be defined to support beam-based operations such as the hybrid beamforming operation as shown in FIG. 12 at mmWave bands or FD-MIMO or massive MIMO operations for lower frequency bands. The functionalities supported by the new RS can include synchronization with a beam (or a composite beam) with the serving base station(s), measurement of a beam (or a composite beam) transmitted by the serving base station(s), reference for estimating large-scale channel properties (such as one or more of delay spread, Doppler spread, Doppler shift, average gain, and average delay) or direct channel estimation reference for the purpose of demodulation of one or more physical channels, and reference for CSI feedback. For NR, one or more new large scale channel properties can also be defined, such as 'channel blockage' (other possible name is 'short term average again', 'small scale channel again' and the like). The introduction of new large scale channel properties can be carrier frequency dependent. For example, 'channel blockage' is included as part of the large scale channel properties for carrier frequency above X GHz. The new RS shall be referred to as measurement RS (MRS). Other names are possible such as beam RS (BRS) (for beam-formed system), or CSI-RS. A single TRP can transmit multiple MRSs. The MRSs from a single TRP may or may not have the same coverage. A UE may be configured to receive MRS from a single TRP or from multiple TRPs in a CoMP operation.

A 5G communication system can be configured with cell-specific MRS (where the configuration of MRS and/or its transmission (or UE assumption of transmission) is the same for all UEs served by the same cell) or UE-specific MRS (where the configuration of MRS and/or its transmission (or UE assumption of transmission) is UE-specific). A MRS can be mapped to only one OFDM symbol in a subframe or multiple OFDM symbols in a subframe.

Figure 13:
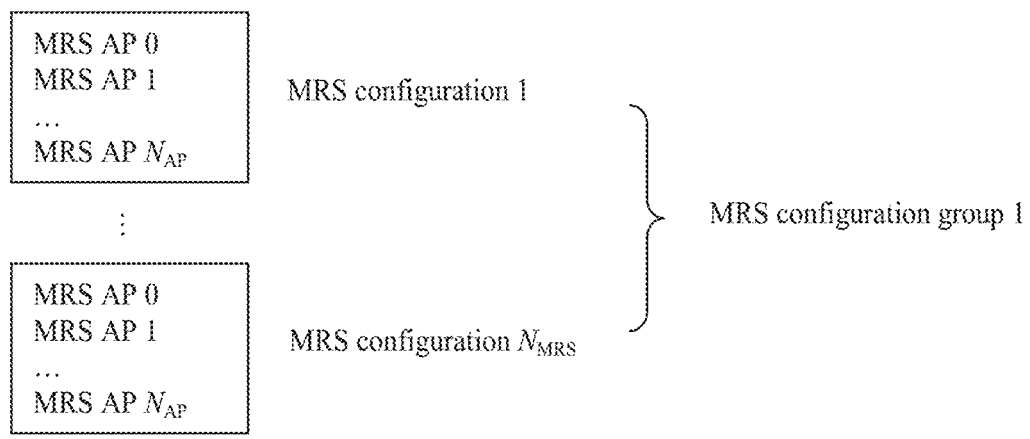
FIG. 13 illustrates an example construction of MRS antenna ports, configurations and configuration groups according to some embodiments of the present disclosure.

FIG. 13 illustrates an example construction of MRS antenna ports, configurations and configuration groups according to some embodiments of the present disclosure.

In one method, a set of MRS antenna ports (MRS AP 0, . . . , $N_{AP}$−1) corresponds to a beam. Such set of MRS antenna ports is referred to as an MRS configuration, or an MRS resource. One or more MRS configurations (one or more beams) can be grouped into one or more groups (beam groups). Such group of MRS configurations is referred to as an MRS configuration group, or an MRS resource set or setting.

Figure 14A:
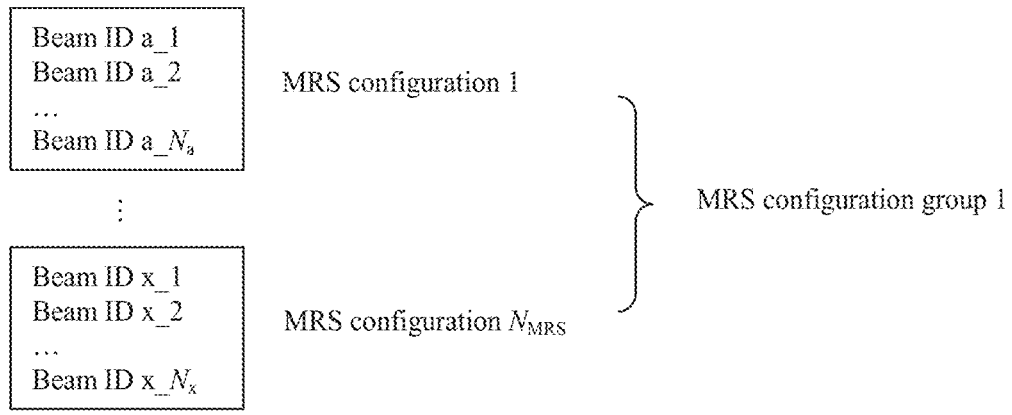
FIG. 14A illustrates another example construction of MRS antenna ports, configurations and configuration groups according to the embodiments of the present disclosure.

FIG. 14A illustrates another example construction of MRS antenna ports, configurations and configuration groups, where the MRS configurations and grouping are based on the beam IDs according to the embodiments of the present disclosure.

Each MRS configuration corresponds to a set of beam IDs. For example, MRS configuration 1 corresponds to beam IDs a_1, . . . a_Na; and MRS configuration $N_{MRS}$ corresponds to beam IDs x_1, . . . , x_Nx. Multiple MRS configurations correspond to an MRS configuration group, and the total number of beam IDs for an MRS configuration group is $N_{AP} \cdot N_{MRS}$. This is illustrated in FIG. 14A.

For this method, unique beam IDs are allocated to MRS mapped on the OFDM symbols in a time period. $N_{AP} \cdot N_{MRS}$ belonging to an MRS configuration group are mapped onto $N_{MRS}$ OFDM symbols, each of which has REs to map reference signals for $N_{AP}$ different beams. In some embodiments, the unique beam IDs may be referred to as MRS antenna port numbers; in this case the MRS antenna port numbers will be 0, . . . $N_{AP} N_{MRS}$−1 and the total number of MRS ports is $N_{AP} \cdot N_{MRS}$. In this disclosure, MRS antenna ports may refer to beam IDs, and those two terminologies can be used inter-changeably.

In some embodiments, the number of beams in an MRS configuration group is configured in initial access broadcast signaling.

In some embodiments, UE is configured with multiple MRS configuration groups (e.g., for inter-cell CoMP), and the numbers of beams for the configured MRS configuration groups are RRC configured.

QCL Definition for MRS

Figure 14B:
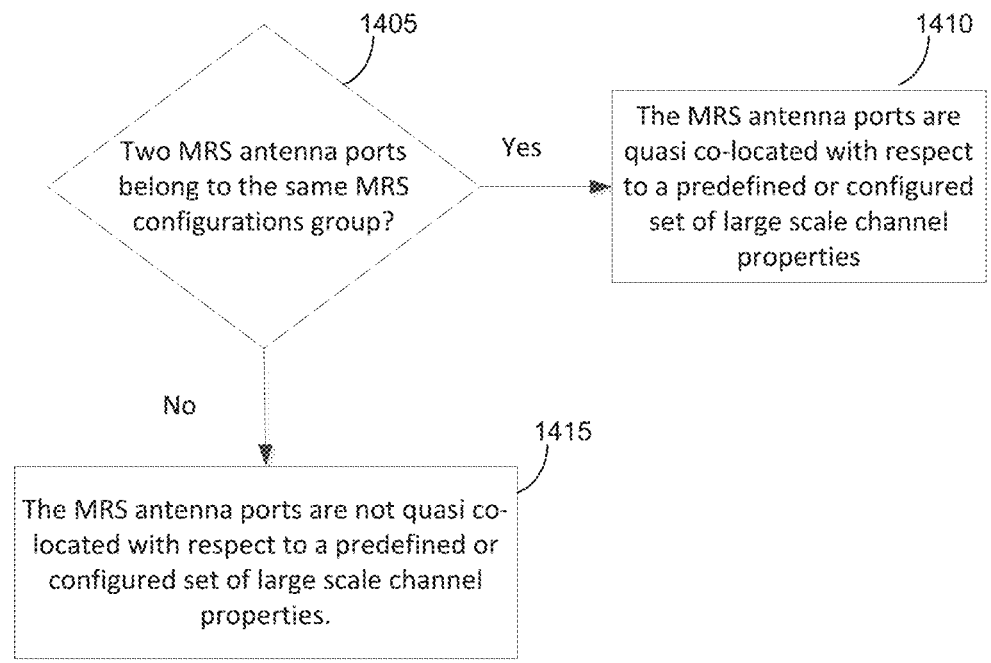
FIG. 14B illustrates the first alternative quasi co-located (QCL) definition for MRS according to embodiments of the present disclosure.

FIG. 14B illustrates an example QCL definition for MRS according to embodiments of the present disclosure.

In the first alternative as shown in FIG. 14B, if two MRS antenna ports belong to the same MRS configurations group at block 1405, the MRS antenna ports belonging to the same MRS configuration group are quasi co-located in one or more of the large scale channel properties, regardless of whether the MRS antenna ports belong to the same MRS configuration or different MRS configurations at block 1410. In other words, the large scale channel parameters estimated using the MRS antenna ports belonging to the same MRS configuration are highly correlated. The UE may assume that the MRS antenna ports belonging to the same group are quasi co-located. Otherwise, the MRS antenna ports are not quasi co-located with respect to a predefined or configured set of large scale channel properties at block 1415.

Figure 14C:
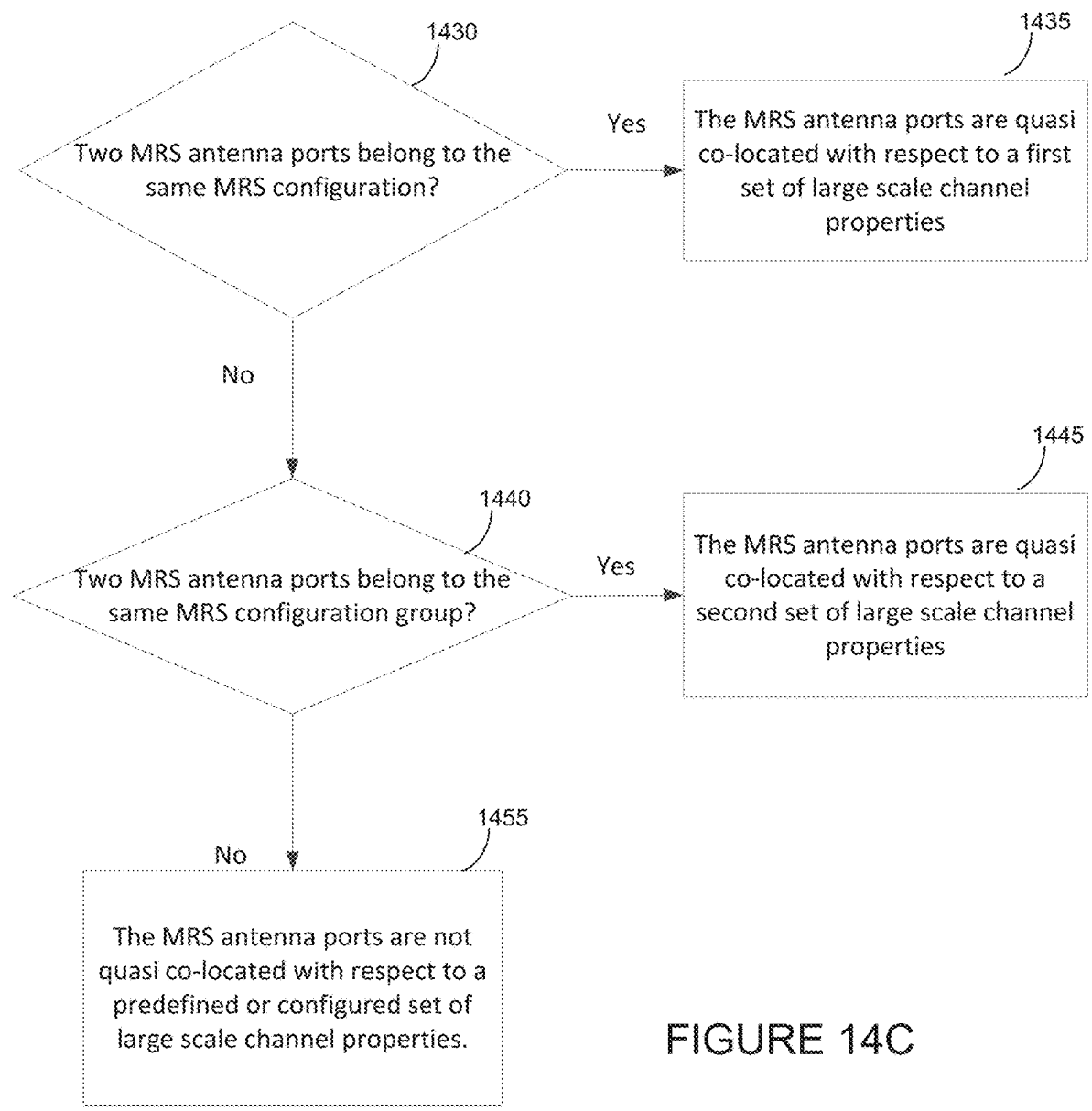
FIG. 14C illustrates another example QCL definition for MRS according to embodiments of the present disclosure.

FIG. 14C illustrates another example QCL definition for MRS according to embodiments of the present disclosure.

In the second alternative as shown in FIG. 14C, the large scale channel properties involved in the quasi co-location assumption for two MRS antenna ports can be assumed as a function of their MRS configuration association and their MRS configurations group association. If two MRS antenna ports belong to the same MRS configuration at block 1430, then the MRS antenna ports are quasi co-located with respect to a first set of large scale channel properties (the UE may assume that the MRS antenna ports are quasi co-located with respect to the first set of large scale channel properties) at block 1435; else if the MRS antenna ports belong to the same MRS configurations group at block 1440, then the MRS antenna ports are quasi co-located with respect to a second set of large scale channel properties (the UE may assume that the MRS antenna ports are quasi co-located with respect to the second set of large scale channel properties) at block 1445; else the MRS antenna ports are not quasi co-located with respect to the predefined (or configured) large scale channel properties (the UE may not assume that the MRS antenna ports are quasi co-located) at block 1455.

An example of the first set of large scale channel properties is {delay spread, Doppler spread, Doppler shift, average gain, and average delay}. An example of the second set of large scale channel properties is (Doppler spread, Doppler shift).

The first and the set sets of large scale channel properties can be either predefined or can be configured by the network (e.g. by RRC signaling). An advantage of network configuration of the large scale channel properties to be included in each set is that it can enable flexible use of the QCL framework depending on the deployment scenario.

In a third alternative, whether the UE assumes the first or the second alternative can be configured by the network (e.g. by RRC signaling). The first alternative can be seen as a special case of the second alternative where the first and the second set of large scale channel properties are the same. The first or the second set of large scale channel properties can also be configured to be an empty set. For example, if the second set is configured to be an empty set, it implies that the UE may not assumed the MRS antenna ports belonging to different MRS configurations to be quasi co-located, regardless of the grouping.

The MRS configurations and the MRS configurations groups can be signaled to the UE by the network, e.g. by the higher layers. In addition, the large scale channel properties applied for QCL relationship for antenna ports within a configuration or within a configurations group can be signaled to the UE by the network, e.g. by the higher layers. The higher layer signaling can be RRC signaling in a UE-specific manner, or it can be broadcast to UEs in a common broadcast control channel, such as a MIB or a SIB. A configuration ID can be associated with a configuration and a configurations group ID can be associated with a configurations group. Any two MRS antenna ports belong to the same MRS configuration if they are associated with the same configuration ID; otherwise they belong to different MRS configurations. Any two MRS antenna ports belong to the same MRS configurations group if their respective MRS configuration is associated with the same MRS configurations group ID; otherwise they belong to different MRS configurations groups.

An advantage of the framework described above is that it can enable the network to flexibly configure MRS configurations and MRS configuration groups according to the deployment scenario, including scenarios with beamforming-based system and non-beamforming based systems (or multi-beam based systems and single-beam based systems).

Denote $N_G$ as the number of MRS configurations groups, $N_B$ as the number of MRS configurations within a group (which is assumed the same for all groups for simplicity. In general $N_B$ can be different for different group), and $N_P$ as the number of MRS antenna ports within an MRS configuration (assumed the same for all configurations for simplicity). These numbers can be higher-layer configured. The following are some example network configurations:

Example 1: For non-CoMP deployment scenario in a sub-6 GHz band (excluding FD-MIMO class B with the number of precoded CSI-RS, K>1), the network can configure $N_G=1$, $N_B3=1$, $N_P=1, 2, 4, 8, 16, 32, \ldots$.

Example 2: For non-CoMP FD-MIMO class B with K>1 at sub-6 GHz band, the network can configure $N_G=1$, $N_B=K$, $N_P=1, 2, 4, 8, 16, 32, \ldots$.

Example 3: For CoMP deployment at sub-6 GHz band, assuming CoMP operation with X TRPs, where each TRP is equipped with $N_P$ antenna ports, the network can configure $N_G=X$, $N_B=1$, $N_P=1, 2, 4, 8$. To support a CoMP DPS operation, the first set of large scale channel properties can be configured to be (delay spread, Doppler spread, Doppler shift, average gain, and average delay), while the second set of large scale channel properties can be configured to be (Doppler spread, Doppler shift) if frequency offset between TRPs is sufficiently small, or an empty set if the UE is required to estimate the frequency offset of each TRP separately. To support a CoMP non-coherent JT operation, the first set of large scale channel properties can be configured to be (delay spread, Doppler spread, Doppler shift, average gain, and average delay), while the second set of large scale channel properties can be configured to be (Doppler spread, Doppler shift). To support a CoMP coherent JT operation, the first set and the second set of large scale channel properties can be configured to be (delay spread, Doppler spread, Doppler shift, average gain, and average delay).

Example 4: For Non-CoMP deployment at above-6 GHz bands (mmWave bands) where a TRP is equipped with X lowly correlated beam groups (not QCL-ed in "channel blockage") with Y highly correlated beams per group (QCL-ed in "channel blockage"), the network can configure $N_G=X$, $N_B=Y$, $N_P=1, 2, 4, 8$. Configuring multiple groups for non-CoMP scenario is beneficial for protection against random channel blockage phenomenon at mmWave bands, as this can enable the network to switch the beam group to serve a UE when the current serving beam group suffers from blockage.

Example 5: For CoMP deployment at above-6 GHz bands (mmWave bands) with X TRP where each TRP is configured with Y beams, the network can configure $N_G=X$, $N_B=Y$, $N_P=1, 2, 4, 8$.

QCL Relationships Between MRS and Other RSs

In addition to QCL relationships between MRS antenna ports, there is a need to specify the QCL relationships between MRS antenna ports and the other RS types. The relationships can be different depending on whether the MRS is a cell-specific signal or a UE-specific signal. In this disclosure, the DM-RS for PDSCH is used as the example RS. It is understood that the principles can be extended to the DM-RS for other physical channels such as PDCCH. The following QCL types are possible. In the QCL types devised below, MRS may refer to one of MRS antenna port(s) in a configuration group, MRS configuration(s), or MRS configuration group(s). In a special case, cell-specific MRS may be referred to as BRS; and UE-specific MRS may be referred to BRRS or CSI-RS.

Type 0: PDSCH DM-RS is "self-contained" in terms of QCL properties, i.e. the PDSCH DM-RS is not quasi co-located with other RS types with respect to a predefined or configured set of large scale channel properties. Type 0 can be applied for a certain deployment scenario or for a certain PDSCH DM-RS design. For example, Type 0 is applied when the DM-RS and the PDSCH is transmitted with a sufficiently narrow beam, and when the Doppler shift and Doppler spread is sufficiently small. In another example, Type 0 can be applied when the PDSCH DM-RS is designed to have sufficient density in frequency and time.

Type 1: A cell-specific MRS is quasi co-located with PDSCH DM-RS with respect to a predefined or configured set of large scale channel properties. An example of the cell-specific MRS is a cell-specific BRS. An example of the large scale channel properties is {average gain, and average delay, delay spread, Doppler spread and Doppler shift}. A cell may have multiple cell-specific MRS identified by a distinct MRS configurations group. In this case, Type 1 can be applied to cell-specific MRS from a group, i.e. a cell-specific MRS belonging to a group is quasi co-located with PDSCH DM-RS.

Type 1 is applicable e.g. when the cell-specific MRS has sufficient time-domain density for Doppler estimation, or when the channel has sufficiently small Doppler, and when the DM-RS precoding is formed on the same set of beams comprising the cell-specific MRS.

Type 2: A cell-specific MRS is quasi co-located with PDSCH DM-RS with respect to a first set of large scale channel properties while a UE-specific MRS is quasi co-located with PDSCH DM-RS with respect to a second set of large scale channel properties. The set of cell-specific MRS and the set of UE-specific MRS that are quasi-located with PDSCH DM-RS in their respective large scale channel properties can be configured by the network, e.g. by higher layer signaling.

For example, the MRS configurations indicated can include (but not limited to) the number of antenna ports, the ID used for scrambling the MRS or for identifying the resource location of the MRS (in time and frequency), the bandwidth of the MRS and the actual set of large scale channel properties for quasi co-location assumption with the PDSCH DM-RS. When more than one UE-specific MRS configurations which are not quasi co-located (e.g. because they belong to different group) can be quasi co-located with PDSCH DM-RS, the UE-specific MRS configuration that may be assumed by the UE to be quasi co-located when receiving a PDSCH can be dynamically indicated in a PDCCH (chosen from the higher layer configured set) e.g. the DCI scheduling the PDSCH (e.g. on subframe or TTI basis). Moreover, when the second set of large scale channel properties can be different for different set of UE-specific MRS, the set of large scale channel properties the UE may assume for quasi co-location is also dynamically changed according to DCI signaling (e.g. on subframe or TTI basis).

In one example of Type 2, or Type 2A, the first set of large scale channel properties can be predefined or configured by the network to be (Doppler spread and Doppler shift), while the second set of large scale channel properties can be refined or configured by the network to be (average gain, and average delay, delay spread). Type 2A is applicable e.g. for a CoMP deployment scenario where the cell-specific MRS is transmitted in a SFN manner while the UE-specific MRS is transmitted in a TRP-specific manner (in the same way as the PDSCH); and/or when the cell-specific MRS can provide sufficient quality of Doppler estimation (e.g. it has sufficient time domain density); and/or when the channel for PDSCH has sufficiently small Doppler.

In another example of Type 2, or Type 2B, the first set of large scale channel properties can be predefined or configured by the network to be (average gain, and average delay, delay spread), while the second set of large scale channel properties can be predefined or configured by the network to be (Doppler spread and Doppler shift). Type 2B is applicable when the cell-specific MRS does not have sufficient time-domain density for Doppler estimation but UE-specific MRS has (or is configured to have) sufficient time-domain density for Doppler estimation. An example of the cell-specific MRS is a cell-specific BRS. Examples of the UE-specific MRS includes a beam RS designed for fine beam alignment (beam refinement RS or BRRS) and CSI-RS.

Type 3: A UE-specific MRS is quasi co-located with PDSCH DM-RS with respect to a predefined or configured set of large scale channel properties. Examples of the UE-specific MRS includes BRRS and CSI-RS. The set of UE-specific MRS that are quasi-located with PDSCH DM-RS in their respective large scale channel properties can be configured by the network, e.g. by higher layer signaling. When more than one UE-specific MRS configurations which are not quasi co-located (e.g. because they belong to different groups) can be quasi co-located with PDSCH DM-RS, the UE-specific MRS configuration that may be assumed by the UE to be quasi co-located when receiving a PDSCH can be dynamically indicated in a PDCCH e.g. the DCI scheduling the PDSCH (e.g. on subframe or TTI basis). Moreover, when the second set of large scale channel properties can be different for different set of UE-specific MRS, the set of large scale channel properties the UE may assume for quasi co-location is also dynamically changed according to DCI signaling (e.g. on subframe or TTI basis).

The QCL types as described above can be configured by the network. This is beneficial when more than one RS pattern (which has different time-domain and/or frequency domain density) for MRS and/or DM-RS, and the actual RS patterns to be assumed by the UE, can be configured by the network. The QCL types can also be predefined or configured separately according the RS types or the corresponding physical channel or the transport channel that are involved in the QCL relationship with the MRS. For example, the QCL relationship between PDCCH DM-RS and MRS can be predefined or configured to be Type 0 (because of the low data rate and robust MCS of PDCCH) while the QCL relationship between PDSCH DM-RS and MRS can be predefined or configured to be Type 0, 1, 2, or 3. In another example, the DM-RS for PDSCH used for broadcast control channel (e.g. SIB) can be predefined or configured to be Type 0 while the DM-RS for PDSCH used for unicast data can be predefined or configured to be Type 0, 1, 2 or 3.

MRS Pattern Configurations and Relationships to QCL

In order to support scenarios that involve diverse mobility, delay spread etc., it may be beneficial to flexibly configure MRS pattern or density so that a desired subset of quasi-colocation properties {average gain, and average delay, delay spread, Doppler spread and Doppler shift} may be estimated reliably.

In a first embodiment, cell-specific or UE-specific MRS pattern is associated with QCL type configuration.

Figure 15:
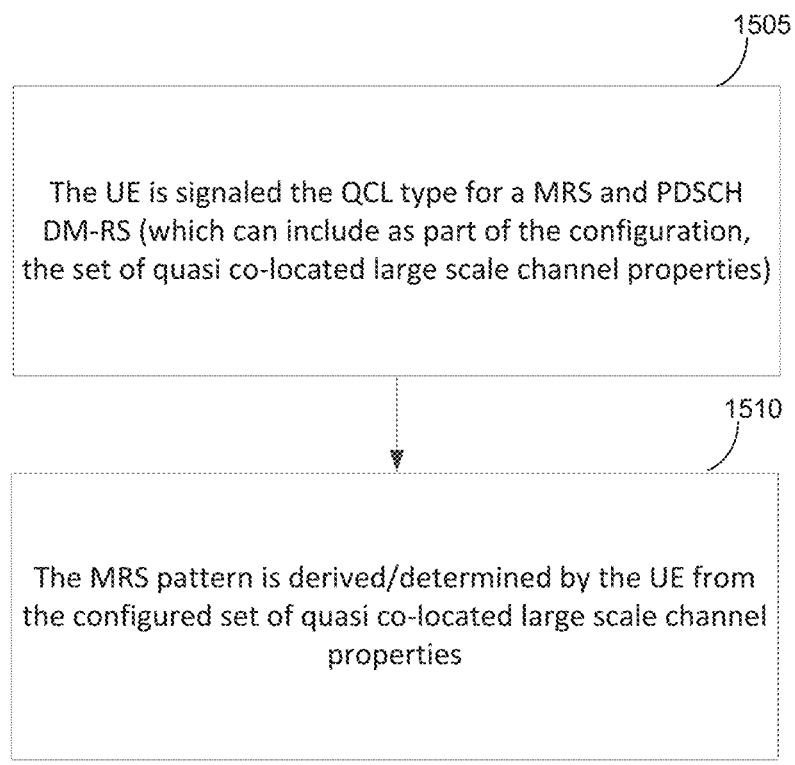
FIG. 15 illustrates an example MRS pattern configurations and relationships to QCL, where the cell-specific or UE-specific MRS pattern is associated with QCL type configuration according to embodiments of the present disclosure.

FIG. 15 illustrates an example MRS pattern configurations and relationships to QCL, where the cell-specific or UE-specific MRS pattern is associated with QCL type configuration according to embodiments of the present disclosure.

The UE derives the MRS patterns from the QCL type configurations signaled to the UE (which can be directly signaled by the network or can be derived through association via grouping with another MRS which is indicated the QCL type).

In the first example, when Type 1 QCL is configured for a cell-specific MRS such that PDSCH DM-RS is quasi co-located with the configured MRS on large scale channel properties (average gain, and average delay, delay spread, Doppler spread and Doppler shift) at block 1505, the MRS is configured with a first RS pattern whose time and frequency density enables sufficient estimation of the large scale channel properties up to a certain propagation conditions, including (but not limited to) average gain, and average delay, delay spread, Doppler spread and Doppler shift at block 1510.

In the second example, when Type 1 QCL is configured for a cell-specific MRS such that PDSCH DM-RS is quasi co-located with the configured MRS on large scale channel properties {average gain, and average delay, delay spread}, the MRS is configured with a second RS pattern whose time and frequency density enables sufficient estimation of the large scale channel properties up to a certain propagation conditions, including (but not limited to) average gain, and average delay, delay spread.

In the third example, when Type 1 QCL is configured for a cell-specific MRS such that PDSCH DM-RS is quasi co-located with the configured MRS on large scale channel properties (Doppler spread and Doppler shift), the MRS is configured with a third RS pattern whose time and frequency density enables sufficient estimation of the large scale channel properties up to a certain propagation conditions, including (but not limited to) Doppler spread and Doppler shift.

In the fourth example, when Type 2 QCL is configured, such that a cell-specific MRS is quasi co-located with PDSCH DM-RS with respect to a first set of large scale channel properties while a UE-specific MRS is quasi co-located with PDSCH DM-RS with respect to a second set of large scale channel properties, the cell-specific MRS pattern is derived/determined from the respective set of large scale channel properties.

In the fifth example, when Type 2 QCL is configured such that a cell-specific MRS quasi co-located with PDSCH DM-RS with respect to a first set of large scale channel properties while a UE-specific MRS is quasi co-located with PDSCH DM-RS with respect to a second set of large scale channel properties, then the cell-specific MRS pattern is derived/determined according to the first set of quasi co-location properties while the UE-specific MRS pattern is derived/determined according to the combination of the first and the second set of quasi co-location properties.

In the sixth example, when Type 3 QCL is configured such that a UE-specific MRS is configured to be quasi co-located with PDSCH DM-RS on a first set of large scale channel properties, the MRS pattern can be derived/determined from configured the quasi co-located large scale channel properties.

In the second embodiment, a QCL type of configuration is associated with a cell-specific MRS pattern or a UE-specific MRS pattern.

Figures 16A, 16B:
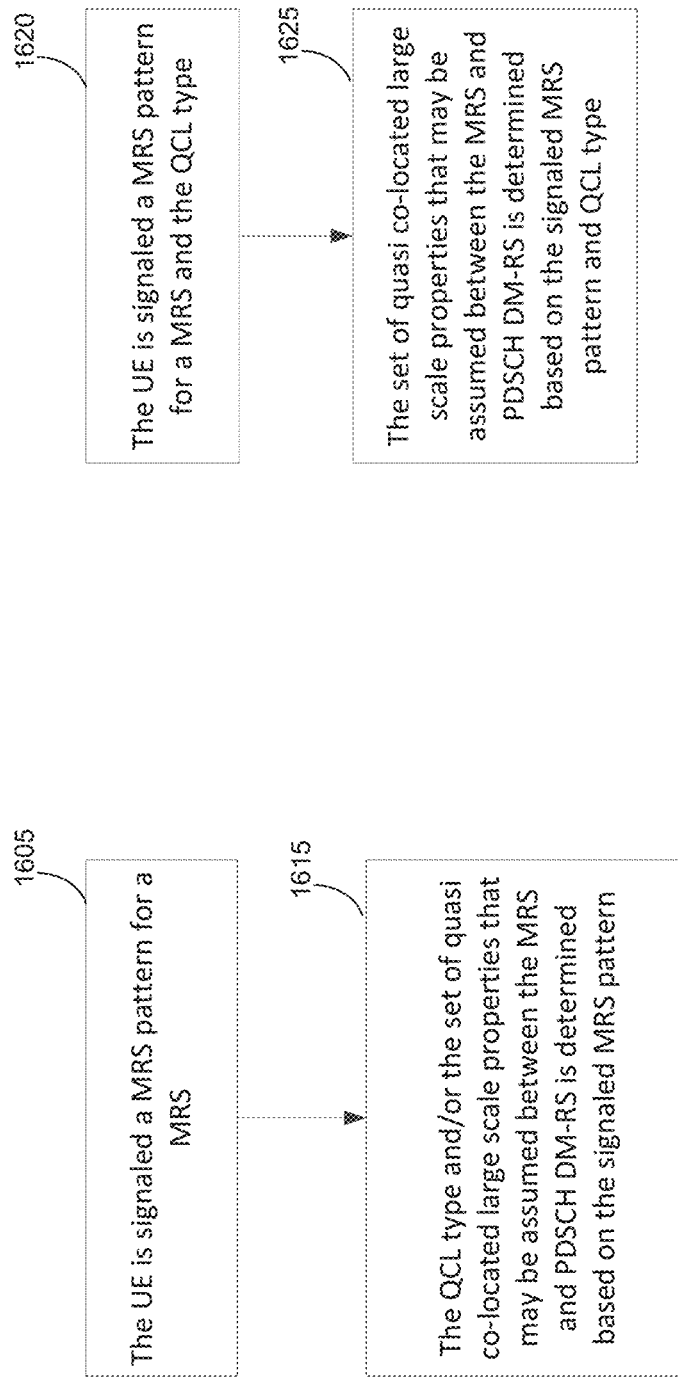
FIG. 16A illustrates an example MRS pattern configurations and relationships to QCL where a QCL type of configuration is associated with a cell-specific MRS pattern or a UE-specific MRS pattern according to embodiments of the present disclosure.
FIG. 16B illustrates another example MRS pattern configurations and relationships to QCL according to embodiments of the present disclosure.

FIG. 16A illustrates an example MRS pattern configurations and relationships to QCL where a QCL type of configuration is associated with a cell-specific MRS pattern or a UE-specific MRS pattern according to embodiments of the present disclosure.

The UE is signaled an MRS pattern for an MRS at block 1605 and the UE derives/determines the QCL type and/or the set of quasi co-located large scale channel properties from the configured cell-specific MRS pattern or the UE-specific MRS pattern or both at block 1615.

In another alternative, the UE derives or determines the set of quasi co-located large scale channel properties from the configured cell-specific MRS pattern or the UE-specific MRS pattern or both, as well as the QCL type (without explicit configuration of the quasi co-located large scale channel properties).

FIG. 16B illustrates an example MRS pattern configurations and relationships to QCL according to embodiments of the present disclosure.

The UE is signaled an MRS pattern for an MRS and the QCL type at block 1620, the UE derives or determines the set of quasi co-located large scale channel properties from the configured cell-specific MRS pattern or the UE-specific MRS pattern or both, as well as the QCL type at block 1625.

The rationale is that the large scale channel properties can be estimated depend on the MRS pattern (e.g., density in time and frequency), and therefore given a configured MRS pattern, it can be associated with the appropriate QCL assumptions.

In the first example, when the Type 1 QCL cell-specific MRS and a first cell-specific MRS pattern are configured, a cell-specific MRS QCL configuration may be derived from the MRS pattern configuration. Under this MRS pattern configuration, the QCL configuration indicates PDSCH DM-RS is quasi co-located with the configured MRS on a set of large scale channel properties.

In the second example, when the Type 2 QCL, with a cell-specific MRS of cellMrsPattern pattern and a UE-specific MRS of ueMrsPattern pattern are configured, the cell-specific MRS is determined by the UE to be quasi co-located with a first set of large scale channel properties and the UE-specific MRS is determined to be quasi co-located with a second set of large scale channel properties.

In the third example, when the Type 3 QCL, K+1 (K>=0) UE-specific MRSs are configured patterns {ueMrsPattern0 . . . ueMrsPatternK}. A QCL configuration can be derived from the pattern configuration configured for each UE-specific MRS, and is assumed to be quasi co-located with a same or different set of large scale channel properties.

In the third embodiment, a cell-specific MRS pattern or a UE-specific MRS pattern or both are configured independently regardless of QCL type or configuration for the MRS.

In the first example, a certain cell-specific MRS pattern is configured where the pattern corresponds to a certain type of time and frequency allocation for the MRS. The pattern can be indicated by bit field that may be dynamically signaled by DCI or semi-statically configured by higher layer signaling.

In the second example, one or more UE-specific MRS pattern(s) are configured, each pattern corresponding to a group of MRS. For example, two UE-specific MRS patterns are configured, where a first set of configured UE-specific MRS has the first MRS pattern and a second set of configured UE-specific MRS has the second MRS pattern. Indications of which UE-specific MRS belong to the first set and which belong to the second set may be signaled by bit field either by DCI or higher layer signaling. For example, "0" implies an MRS is associated with the first set of MRS pattern and "1" implies the MRS is associated with the second set of MRS pattern.

In the third example, a certain cell-specific MRS pattern is configured together with one or more UE-specific MRS pattern(s). In one example, a joint bit field may be used to jointly configure one cell-specific MRS pattern and one UE-specific pattern: "0" may correspond to a first set of configurations including a cell-specific MRS pattern and a UE-specific MRS pattern, and "1" may correspond to a second set of configuration including a same or different cell-specific MRS pattern and UE-specific MRS pattern.

UE Initiated or Requested MRS Configurations

One purpose of QCL is for a UE to associate large scale channel properties for improving channel estimation quality. Due to varying UE capabilities, dynamically changing UE propagation conditions as well as different quality-of-service (QoS), an UE may need different support of QCL during its channel estimation. Therefore, it may be advantageous for a UE to request the network to configure MRS according to its needs.

In the first embodiment, a UE is configured with K cell-specific MRS patterns and/or N UE-specific MRS patterns. The UE is served by a subset of the configured cell-specific patterns and/or UE specific patterns, and the UE can request a change of cell-specific MRS pattern and/or UE-specific MRS pattern to the network.

In the first example, when the QCL Type 3 is configured to be quasi co-located on large scale channel properties {average gain, and average delay, delay spread, Doppler spread and Doppler shift} and an UE-specific MRS is transmitted on a certain MRS pattern out of N UE-specific MRS patterns. The TIE may request a change of MRS pattern via a bit field indication on either PUCCH or PUSCH or RACH.

Alternatively, UE request can be performed via higher layering signaling such as MAC CE signaling or RRC signaling. For example, assuming X number of possible RS patterns are predefined or configured by the network via higher layer signaling (e.g. RRC), $\log_2(\lambda)$ bits can be included in a PUCCH format or in the UCI payload for PUSCH to request for one of the X RS patterns.

In another alternative, the UE indicates e.g. with 1 bit, the request to change MRS pattern, without indicating the desired MRS pattern and it is up to the network to configure the updated MRS pattern. Conditions to trigger change request may depend on UE implementation and may relate to changes of UE propagation conditions such as UE speed, delay spread or blockage. For example, the current serving UE-specific MRS pattern may support to up to a certain speed, and the UE speed may increase and the UE may detect that the time-density of the current UE-specific MRS pattern is insufficient. Therefore, the UE may trigger to change to UE-specific MRS pattern with higher time density.

In another alternative, the UE triggers a request to change MRS pattern if a predefined or configured condition is satisfied. In one example, HARQ-NACK has been generated or reported for a certain number of times (predefined or configured). In another example, the condition is that the UE measured delay spread or Doppler has exceeded a certain threshold.

In the second example, when the QCL Type 2 is configured where a cell-specific MRS is quasi co-located with PDSCH DM-RS with respect to a first set of large scale channel properties, while a UE specific MRS is quasi co-located with PDSCH DM-RS with respect to a second set of large scale channel properties. The UE-specific MRS is transmitted according to a certain UE-specific MRS pattern out of K UE-specific MRS patterns. The UE may request a change of UE-specific MRS pattern without changing the cell-specific MRS pattern.

Additional signaling methods to support non-coherent joint transmission (JT)

For enabling non-coherent JT transmission, the DM-RS ports of different set of data (PDSCH) transmission layers can be configured to be quasi co-located with different set of UE-specific MRS antenna ports (either MRS configuration or configurations group). For example, assuming non-coherent JT from two TRPs, the DM-RS ports of a first of set of data (PDSCH) transmission layers (from a first TRP) can be configured to be quasi co-located with a first set of UE-specific MRS antenna ports, while the DM-RS ports of a second set of data (PDSCH) transmission layers (from a second TRP) can be configured to be quasi co-located with a second set of UE-specific MRS antenna ports. The set of UE-specific MRS configurations for non-coherent JT operation can be configured to the UE by the network by higher layer signaling. There is a need to specify the QCL mapping of PDSCH layers to UE-specific MRS configurations.

In one method, the QCL association of a set of PDSCH layers with an MRS configuration can be signaled explicitly in a PDCCH, e.g. the PDCCH containing the DCI scheduling the corresponding PDSCH. Assuming X UE-specific MRS configurations are configured with quasi co-location with PDSCH DMRS, $\log_2(\lambda)$ number of bits can be included in the DCI scheduling a set of PDSCH layers to indicate one of the X quasi co-located UE-specific MRS. The information bits can also be jointly encoded with other information field.

In another method, the QCL association of a set of PDSCH layers with an MRS configuration can be signaled implicitly with other information of the PDSCH layers or attributes associated with the PDSCH layers. For example, assuming the PDSCH layers of a TRP corresponds to one codeword, then the codeword index for the PDSCH layers can be used to map to a set of UE-specific MRS antenna ports for QCL assumption purpose (e.g. the PDSCH layers corresponding to a first codeword is assumed quasi co-located with a first set of MRS antenna ports, while the PDSCH layers corresponding to a second codeword is assumed quasi co-located with a second set of MRS antenna ports). The codeword index can be explicitly obtained from the DCI or can be implicitly derived, e.g. if codeword index is used to scramble the PDCCH or the PDCCH's CRC. Instead of codeword index, other possible examples include HARQ process ID (assuming the PDSCH layers of a TRP corresponds to one HARQ process ID), TRP ID (or virtual cell ID) (assuming the PDSCH layers of a TRP can be identified with the TRP ID).

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an example embodiment, various changes and modifications may be suggested to one skilled in the art. It is intended that the present disclosure encompass such changes and modifications as fall within the scope of the appended claims.

What is claimed:

1. A base station, comprising:
at least one transceiver; and
at least one processor configured to:
transmit configuration information for sets of large scale channel properties to a user equipment (UE) via the at least one transceiver, wherein a type of each of the sets of large scale channel properties is one of a plurality of types including a first type and a second type,
wherein, if the type is the first type, the set of large scale channel properties comprises a delay spread, a Doppler spread, a Doppler shift, and an average delay, and
wherein, if the type is the second type, the set of large scale channel properties comprises a Doppler spread and a Doppler shift, and transmit a demodulation reference signal (DM-RS) of a physical downlink shared channel (PDSCH) to the UE via the at least one transceiver, wherein an antenna port of the DM-RS of the PDSCH and an antenna port of a first reference signal (RS) are quasi co-located according to a first of the sets of large scale channel properties and the antenna port of the DM-RS of the PDSCH and an antenna port of a second RS are quasi co-located according to a second of the sets of large scale channel properties.

2. The base station of claim 1, wherein the sets of large scale channel properties each include at least one of a delay spread, a Doppler spread, a Doppler shift, an average gain, or an average delay, and wherein the configuration information is transmitted via a radio resource control (RRC) signaling.

3. The base station of claim 1, wherein the first set of large scale channel properties is associated with an RS configuration corresponding to the first RS, and wherein the RS configuration indicates a RS pattern for the first RS.

4. The base station of claim 3, wherein the RS configuration includes a number of antenna ports and a scrambling identity.

5. The base station of claim 3, wherein RS ports of the RS configuration are quasi co-located according to large scale channel properties including a delay spread, a Doppler spread, a Doppler shift, an average gain, and an average delay.

6. The base station of claim 3, wherein the RS pattern corresponds to a type of time and frequency allocation for one or more RSs of the RS configuration.

7. The base station of claim 1, wherein a RS pattern of the first RS is configured by higher layer signaling, and wherein the first RS comprises a channel state information-reference signal (CSI-RS).

8. The base station of claim 1, wherein the at least one processor is further configured to:

transmit downlink control information (DCI) including bits on a physical downlink control channel (PDCCH) to the UE via the at least one transceiver, wherein the bits indicate a RS configuration among RS configurations specific to the UE and one of the sets of large scale channel properties.

9. A user equipment (UE), comprising:

at least one transceiver; and at least one processor configured to:

receive configuration information for sets of large scale channel properties from a base station via the at least one transceiver, wherein a type of each of the sets of large scale channel properties is one of a plurality of types including a first type and a second type, wherein, if the type is the first type, the set of large scale channel properties comprises a delay spread, a Doppler spread, a Doppler shift, and an average delay, and wherein, if the type is the second type, the set of large scale channel properties comprises a Doppler spread and a Doppler shift, and receive a demodulation reference signal (DM-RS) of a physical downlink shared channel (PDSCH) from the base station via the at least one transceiver, wherein an antenna port of the DM-RS of the PDSCH and an antenna port of a first reference signal (RS) are quasi co-located according to a first of the sets of large scale channel properties and the antenna port of the DM-RS of the PDSCH and an antenna port of a second RS are quasi co-located according to a second of the sets of large scale channel properties.

10. The UE of claim 9, wherein the sets of large scale channel properties each include at least one of a delay spread, a Doppler spread, a Doppler shift, an average gain, or an average delay, and wherein the configuration information is transmitted via a radio resource control (RRC) signaling.

11. The UE of claim 9, wherein the first set of large scale channel properties is associated with an RS configuration corresponding to the first RS, and wherein the RS configuration indicates a RS pattern for the first RS.

12. The UE of claim 11, wherein the RS configuration includes a number of antenna ports and a scrambling identity.

13. The UE of claim 11, wherein RS ports of the RS configuration are quasi co-located according to large scale channel properties including a delay spread, a Doppler spread, a Doppler shift, an average gain, and an average delay.

14. The UE of claim 11, wherein the RS pattern corresponds to a type of time and frequency allocation for one or more RSs of the RS configuration.

15. The UE of claim 9, wherein a RS pattern of the first RS is configured by higher layer signaling, and wherein the first RS comprises a channel state information-reference signal (CSI-RS).

16. The UE of claim 9, wherein the at least one processor is further configured to:

receive downlink control information (DCI) including bits on a physical downlink control channel (PDCCH) from the base station via the at least one transceiver, wherein the bits indicate a RS configuration among RS configurations specific to the UE and one of the sets of large scale channel properties.

17. A method performed by a base station, the method comprising:

transmitting configuration information for sets of large scale channel properties to a user equipment (UE), wherein a type of each of the sets of large scale channel properties is one of a plurality of types including a first type and a second type, wherein, if the type is the first type, the set of large scale channel properties comprises a delay spread, a Doppler spread, a Doppler shift, and an average delay, and wherein, if the type is the second type, the set of large scale channel properties comprises a Doppler spread and a Doppler shift; and transmitting a demodulation reference signal (DM-RS) of a physical downlink shared channel (PDSCH) to the UE, wherein an antenna port of the DM-RS of the PDSCH and an antenna port of a first reference signal (RS) are quasi co-located according to a first of the sets of large scale channel properties and the antenna port of the DM-RS of the PDSCH and an antenna port of a second RS are quasi co-located according to a second of the sets of large scale channel properties.

18. The method of claim 17, wherein the sets of large scale channel properties each include at least one of a delay spread, a Doppler spread, a Doppler shift, an average gain, or an average delay, and wherein the configuration information is transmitted via a radio resource control (RRC) signaling.

19. The method station of claim 17, wherein the first set of large scale channel properties is associated with an RS configuration corresponding to the first RS, and
wherein the RS configuration indicates a RS pattern for the first RS.

20. The method of claim 19, wherein the RS configuration includes a number of antenna ports and a scrambling identity.

21. The method of claim 19, wherein RS ports of the RS configuration are quasi co-located according to large scale channel properties including a delay spread, a Doppler spread, a Doppler shift, an average gain, and an average delay.

22. The method of claim 19, wherein the RS pattern corresponds to a type of time and frequency allocation for one or more RS s of the RS configuration.

23. The method of claim 19, wherein a RS pattern of the first RS is configured by higher layer signaling, and
wherein the first RS comprises a channel state information-reference signal (CSI-RS).

24. The method of claim 17, further comprising:
transmitting downlink control information (DCI) including bits on a physical downlink control channel (PDCCH),
wherein the bits indicate a RS configuration among RS configurations specific to the UE and one of the sets of large scale channel properties.

25. A method performed by a user equipment (UE), the method comprising:
receiving receive configuration information for sets of large scale channel properties from a base station, wherein a type of each of the sets of large scale channel properties is one of a plurality of types including a first type and a second type,
wherein, if the type is the first type, the set of large scale channel properties comprises a delay spread, a Doppler spread, a Doppler shift, and an average delay, and
wherein, if the type is the second type, the set of large scale channel properties comprises a Doppler spread and a Doppler shift; and
receiving a demodulation reference signal (DM-RS) of a physical downlink shared channel (PDSCH) from the base station,
wherein an antenna port of the DM-RS of the PDSCH and an antenna port of a first reference signal (RS) are quasi co-located according to a first of the sets of large scale channel properties and the antenna port of the DM-RS of the PDSCH and an antenna port of a second RS are quasi co-located according to a second of the sets of large scale channel properties.

26. The method of claim 25, wherein the sets of large scale channel properties each include at least one of a delay spread, a Doppler spread, a Doppler shift, an average gain, or an average delay, and
wherein the configuration information is transmitted via a radio resource control (RRC) signaling.

27. The method of claim 25, wherein the set of large scale channel properties is associated with an RS configuration corresponding to the first RS, and wherein the RS configuration indicates a RS pattern for the first RS.

28. The method of claim 27, wherein the RS configuration includes a number of antenna ports and a scrambling identity.

29. The method of claim 27, wherein RS ports of the RS configuration are quasi co-located according to large scale channel properties including a delay spread, a Doppler spread, a Doppler shift, an average gain, and an average delay.

30. The method of claim 27, wherein the RS pattern corresponds to a type of time and frequency allocation for one or more RSs of the RS configuration.

31. The method of claim 25, wherein a RS pattern of the first RS is configured by higher layer signaling, and
wherein the first RS comprises a channel state information-reference signal (CSI-RS).

32. The method of claim 25, further comprising:
receiving downlink control information (DCI) including bits on a physical downlink control channel (PDCCH),
wherein the bits indicate a RS configuration among RS configurations specific to the UE and one of the sets of large scale channel properties.

* * * * *